(12) United States Patent
Pereira et al.

(10) Patent No.: US 9,624,005 B2
(45) Date of Patent: Apr. 18, 2017

(54) FLEXIBLE CONTAINER WITH FITMENT AND PROCESS FOR PRODUCING SAME

(71) Applicant: Dow Global Technologies LLC, Midland, MI (US)

(72) Inventors: Bruno R. Pereira, Santana de Parnaiba (BR); Marcos P. Franca, Sao Paulo (BR)

(73) Assignee: Dow Global Technologies LLC, MIdland, MI (US)

( * ) Notice: Subject to any disclaimer, the term of this patent is extended or adjusted under 35 U.S.C. 154(b) by 0 days.

(21) Appl. No.: 14/800,264

(22) Filed: Jul. 15, 2015

(65) Prior Publication Data

US 2016/0016695 A1    Jan. 21, 2016

Related U.S. Application Data

(60) Provisional application No. 62/025,273, filed on Jul. 16, 2014.

(51) Int. Cl.
*B65D 33/00* (2006.01)
*B65D 37/00* (2006.01)
(Continued)

(52) U.S. Cl.
CPC .............. *B65D 37/00* (2013.01); *B29C 65/08* (2013.01); *B29C 65/18* (2013.01); *B29C 65/749* (2013.01); *B29C 66/1122* (2013.01); *B29C 66/3452* (2013.01); *B29C 66/5344* (2013.01); *B29C 66/612* (2013.01); *B29C 66/63* (2013.01); *B29C 66/73921* (2013.01); *B29C 66/81* (2013.01); *B29C 66/81423* (2013.01); *B29C 66/81431* (2013.01); *B29C 66/8322* (2013.01); *B29C 66/91935* (2013.01); *B31B 19/84* (2013.01); *B65B 3/045* (2013.01); *B65B 43/08* (2013.01); *B65B 61/005* (2013.01); *B65B 61/186* (2013.01); *B65D 33/06* (2013.01); *B65D 33/16* (2013.01); *B65D 75/008* (2013.01); *B65D 75/28* (2013.01); *B65D 75/563* (2013.01); *B65D 75/5866* (2013.01); *B65D 75/5872* (2013.01);
(Continued)

(58) Field of Classification Search
CPC .................................................. B65D 75/5883
USPC ........... 383/36, 906, 67, 104, 120, 901, 907; 222/92
See application file for complete search history.

(56) References Cited

U.S. PATENT DOCUMENTS 1,433,303 A * 10/1922 Sampson .................. A61F 7/08
                                                                 383/105
3,003,681 A    10/1961 Rene
(Continued)

FOREIGN PATENT DOCUMENTS

DE    3925871 A1    2/1991
EP    1182144 A1    2/2002
(Continued)

*Primary Examiner* — Jes F Pascua
(74) *Attorney, Agent, or Firm* — Husch Blackwell LLP

(57) ABSTRACT

A flexible container is provided. The flexible container includes four panels. The four panels form (i) a body portion; (ii) a neck portion, and a flare portion that extends from the neck portion; (iii) a tapered transition portion between the body portion and the neck portion; and (iv) the neck portion has a reduced width. The flare portion has an expanded end. The width of the flare portion gradually increases from the neck portion to the expanded end.

11 Claims, 10 Drawing Sheets

(51) Int. Cl.

| | | |
|---|---|---|
| *B65D 33/06* | (2006.01) | |
| *B65D 33/16* | (2006.01) | |
| *B65B 43/08* | (2006.01) | |
| *B65B 61/00* | (2006.01) | |
| *B65B 61/18* | (2006.01) | |
| *B65D 75/00* | (2006.01) | |
| *B65D 75/28* | (2006.01) | |
| *B65D 75/56* | (2006.01) | |
| *B65D 75/58* | (2006.01) | |
| *B65B 3/04* | (2006.01) | |
| *B31B 19/84* | (2006.01) | |
| *B29C 65/08* | (2006.01) | |
| *B29C 65/18* | (2006.01) | |
| *B29C 65/74* | (2006.01) | |
| *B29C 65/00* | (2006.01) | |
| *B29C 65/48* | (2006.01) | |
| *B29C 65/56* | (2006.01) | |
| *B29C 65/72* | (2006.01) | |

(52) U.S. Cl.
CPC ............ *B29C 65/48* (2013.01); *B29C 65/565* (2013.01); *B29C 65/72* (2013.01); *B29C 66/65* (2013.01); *B29C 66/71* (2013.01); *B29C 2793/009* (2013.01); *B31B 2219/269* (2013.01); *B31B 2219/9054* (2013.01); *B31B 2221/05* (2013.01); *B31B 2221/20* (2013.01); *B65D 2575/586* (2013.01)

(56) References Cited

U.S. PATENT DOCUMENTS

| | | | |
|---|---|---|---|
| 3,112,047 A | 11/1963 | Weinreich et al. | |
| 3,434,652 A * | 3/1969 | Shore | B65D 75/48 229/117.15 |
| 3,810,503 A * | 5/1974 | Lewis, Jr. | A61J 1/10 383/120 |
| 5,761,884 A * | 6/1998 | Tobolka | B65B 9/12 53/370.4 |
| 5,783,638 A | 7/1998 | Lai et al. | |
| 5,823,383 A | 10/1998 | Hins | |
| 5,855,544 A | 1/1999 | Buchanan | |
| 6,126,315 A | 10/2000 | Ichikawa et al. | |
| 6,511,568 B1 * | 1/2003 | Eckstein | B32B 27/08 156/216 |
| 6,832,852 B2 | 12/2004 | Wilkes | |
| 7,005,150 B2 * | 2/2006 | Kuge | B65D 31/06 383/104 |
| 7,147,597 B2 | 12/2006 | Wilkes | |
| 8,231,029 B2 * | 7/2012 | Peer | B65D 75/5883 220/754 |
| 8,348,509 B2 | 1/2013 | Wilkes et al. | |
| 8,360,275 B2 | 1/2013 | Last | |
| 8,840,305 B2 * | 9/2014 | Wilkes | B65D 75/008 383/10 |
| 2003/0077010 A1 * | 4/2003 | Schulz | B65D 75/008 383/66 |
| 2004/0136620 A1 * | 7/2004 | Wilson | B65D 75/5866 383/104 |
| 2004/0144811 A1 * | 7/2004 | Pennaneac'H | B05B 11/048 222/633 |
| 2005/0031230 A1 * | 2/2005 | Emst | B65D 75/008 383/107 |
| 2011/0286688 A1 * | 11/2011 | Gum | B65D 31/10 383/64 |
| 2015/0104120 A1 * | 4/2015 | Huckriede | B65D 75/008 383/36 |
| 2016/0016679 A1 * | 1/2016 | Pereira | B65B 3/027 53/469 |

FOREIGN PATENT DOCUMENTS

| | | |
|---|---|---|
| GB | 1463579 A | 2/1977 |
| WO | 2005/108228 A1 | 11/2005 |

* cited by examiner

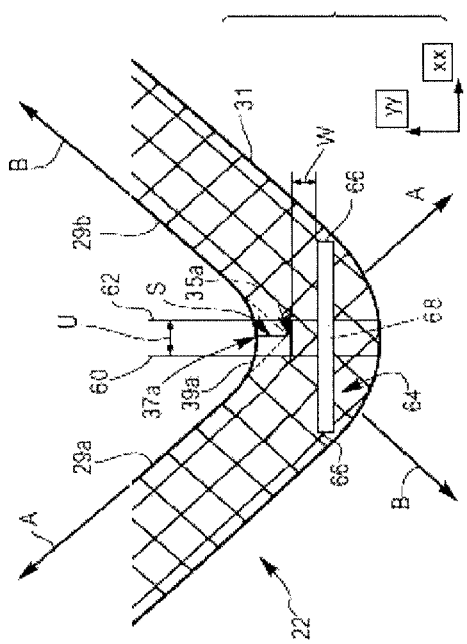

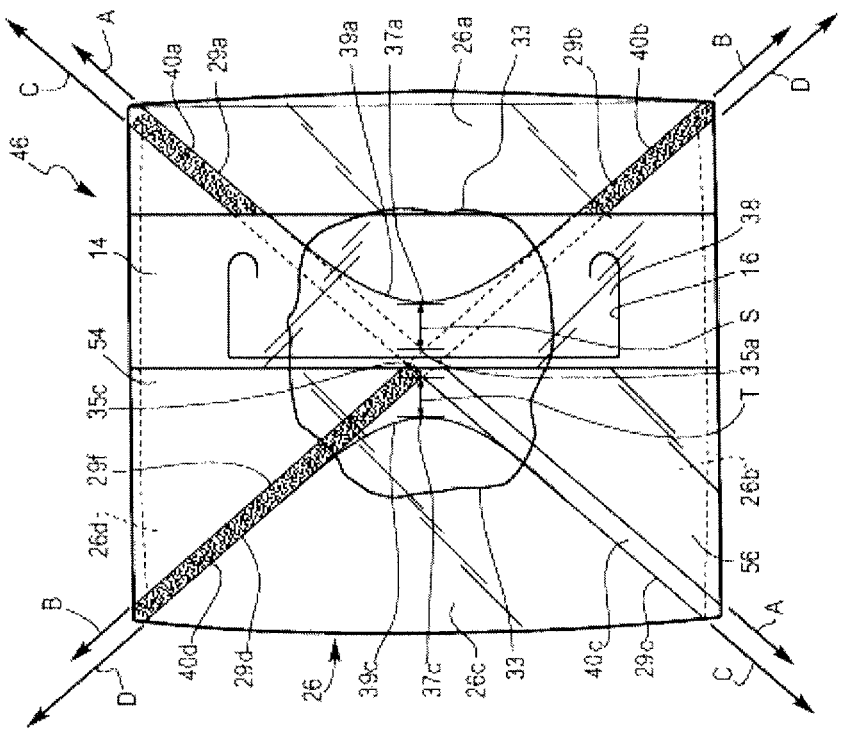
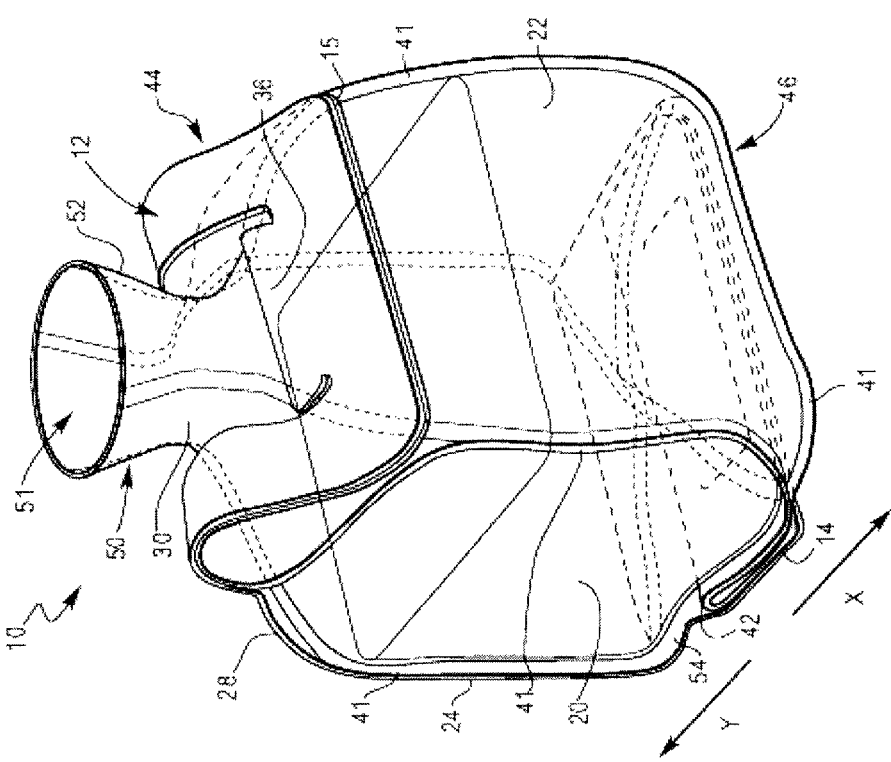

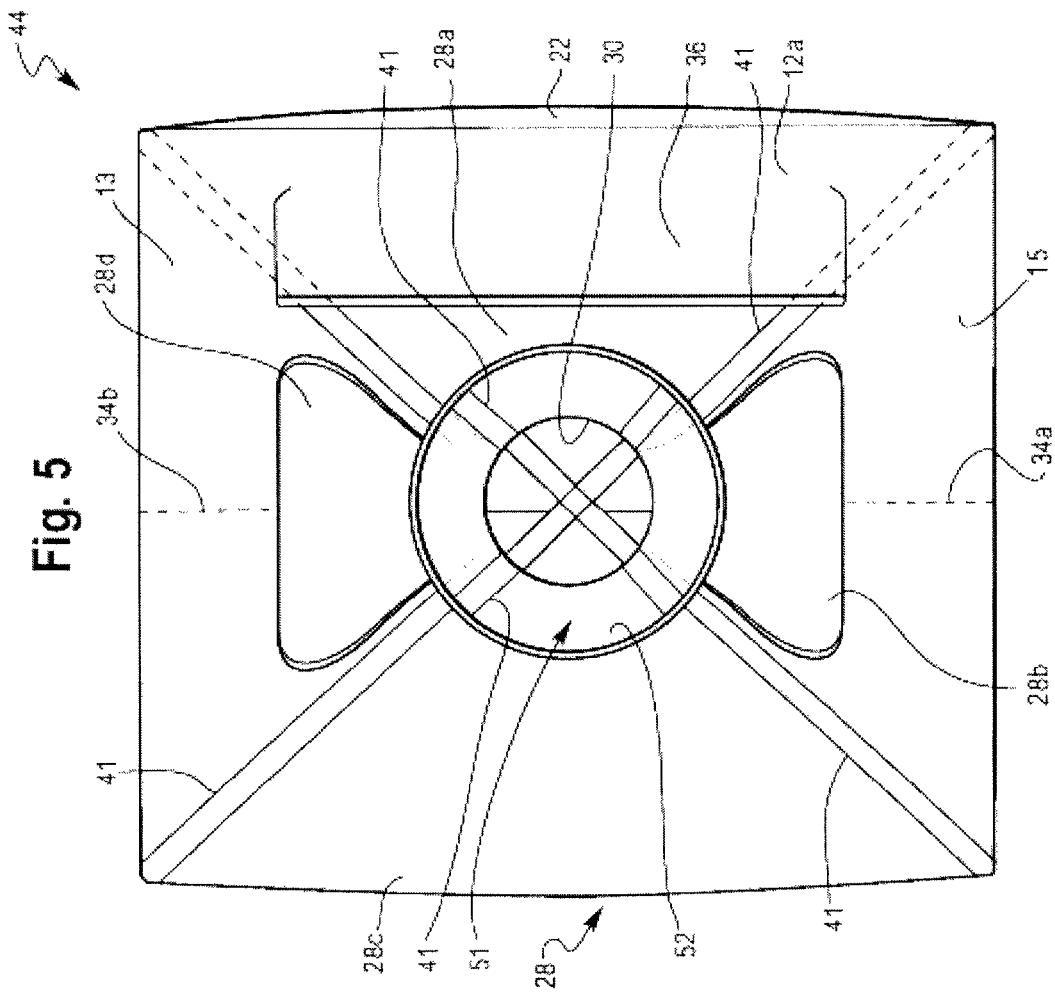

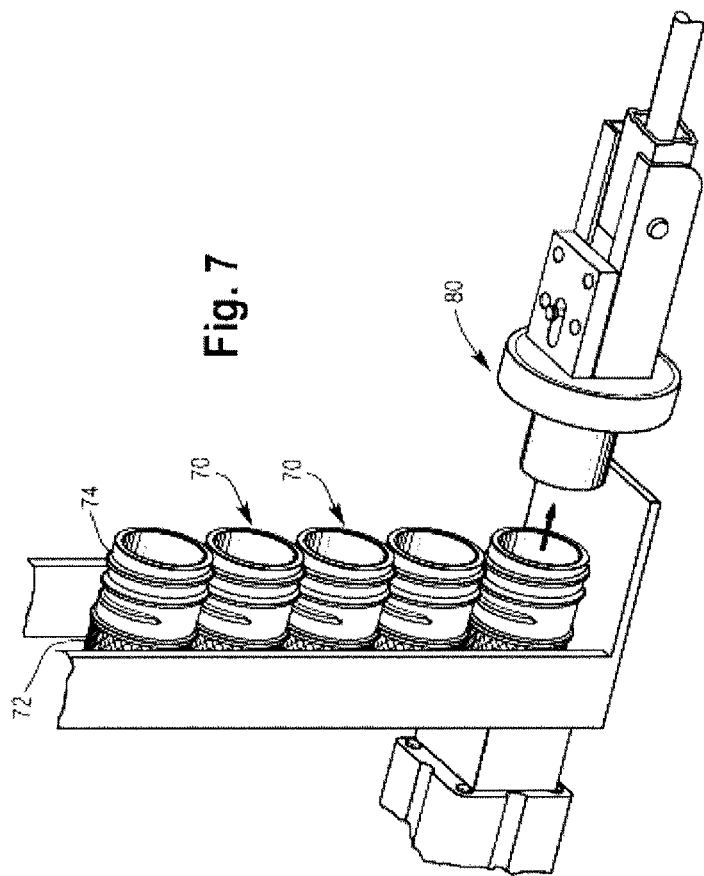
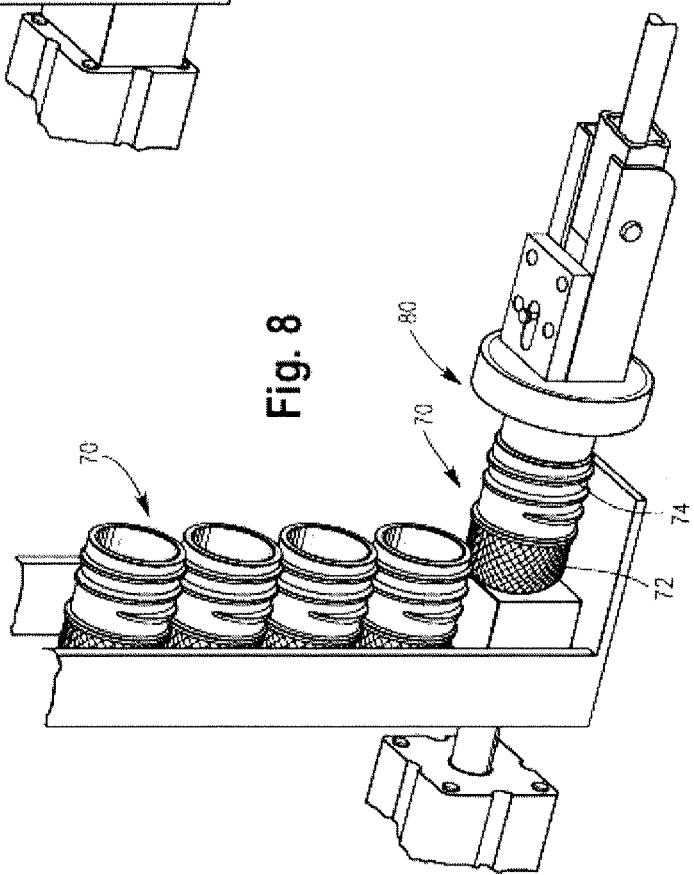

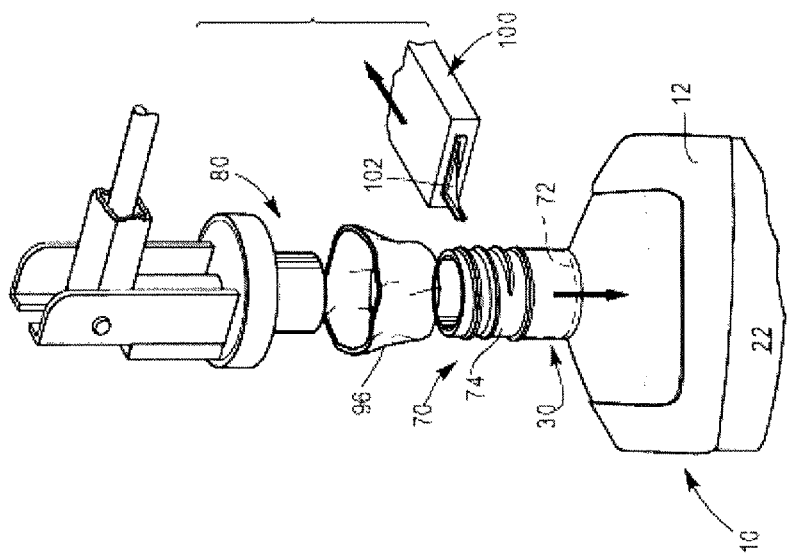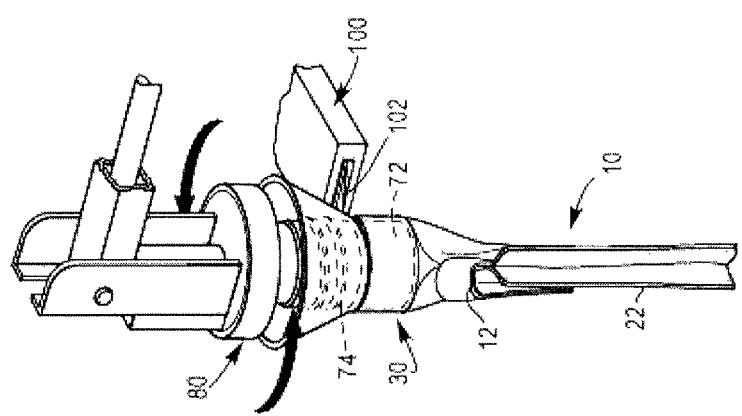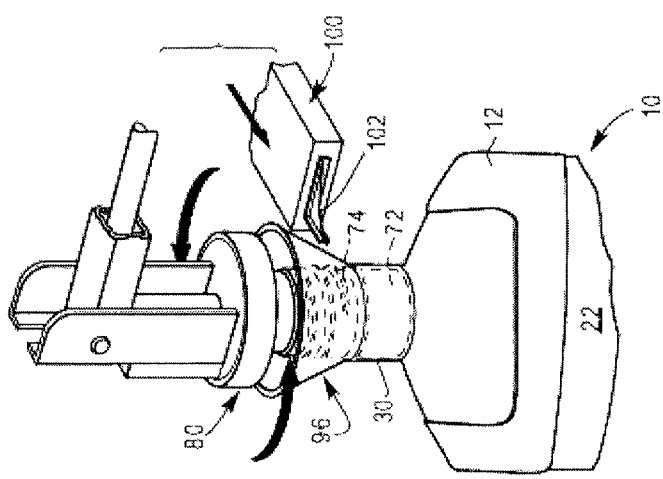

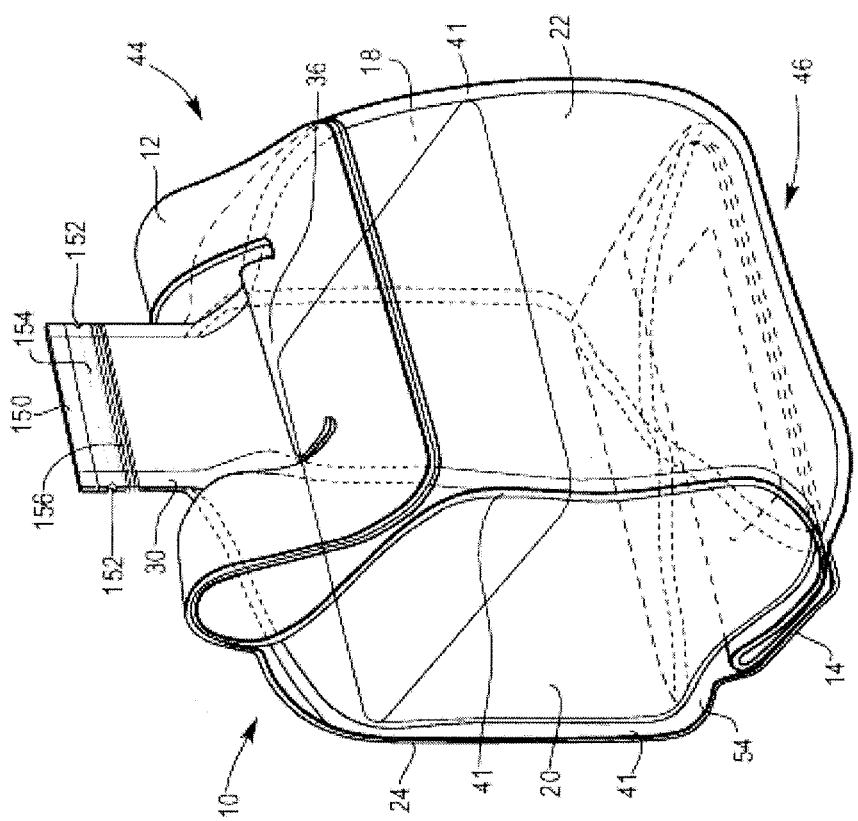

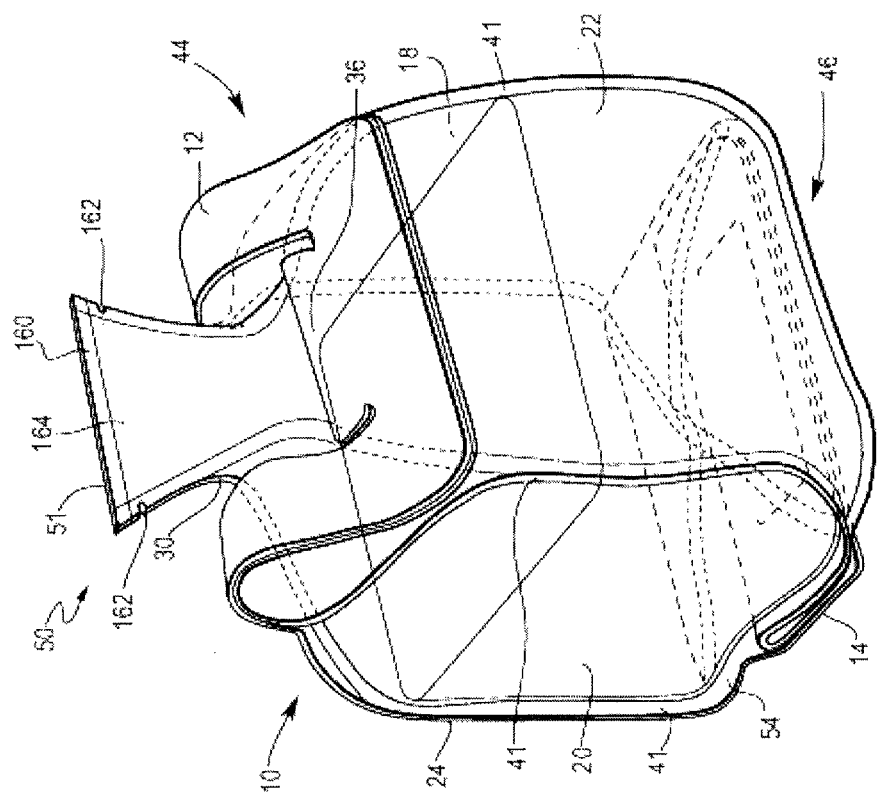

US 9,624,005 B2

FLEXIBLE CONTAINER WITH FITMENT AND PROCESS FOR PRODUCING SAME

BACKGROUND

The present disclosure is directed to a flexible container for dispensing a flowable material and a process for producing the flexible container.

Known are flexible containers with a gusseted body section. These gusseted flexible containers are currently produced using flexible films which are folded to form gussets and heat sealed in a perimeter shape. The gusseted body section opens to form a flexible container with a square cross section or a rectangular cross section. The gussets are terminated at the bottom of the container to form a substantially flat base, providing stability when the container is partially or wholly filled. The gussets are also terminated at the top of the container to form an open neck for receiving a rigid fitment and closure.

Conventional procedures for fabricating gusseted flexible containers with a rigid fitment have shortcomings. One conventional approach only partially heat seals the flexible container—requiring the bottom of the container to remain unsealed or otherwise open. The rigid fitment is subsequently inserted through the open bottom of the container and into the neck. Once the fitment is placed into the neck, the heat seal process continues, with a heat seal formed to close the previously-open container bottom. This approach is inefficient as it interrupts the perimeter heat seal procedure and requires two steps to form the container.

Another conventional approach requires the rigid fitment to be manually installed, upside down, into the neck opening. The fitment is then rotated by hand inside of the flexible container and pushed into place, aligning the fitment with the neck opening to allow proper sealing between the flexible container film structure and the fitment. The fitment is subsequently clamp heat sealed to the neck. This approach is cumbersome, labor intensive and time consuming.

A need exists for a process of producing a gusseted flexible container which increases production efficiencies such as shortened production time, reduction of manual tasks via automation, and a streamlining of production steps.

A need further exists for a process of producing a gusseted flexible container with a fitment having improved impact strength.

A need further exists for a gusseted flexible container having a fitment with improved impact resistance and/or a thin-walled fitment.

SUMMARY

The present disclosure provides a process for producing a flexible container and the resultant flexible container.

In an embodiment, a flexible container is provided. The flexible container includes four panels. The four panels form (i) a body portion; (ii) a neck portion, and a flare portion that extends from the neck portion; (iii) a tapered transition portion between the body portion and the neck portion; (iv) the neck portion having a reduced width, the flare portion having an expanded end. The width of the flare portion gradually increases from the neck portion to the expanded end.

The present disclosure provides another flexible container. In an embodiment a flexible container is provided and includes four panels. The four panels form (i) a body portion; (ii) a neck portion, and a flare portion that extends from the neck portion; (iii) a tapered transition portion between the body portion and the neck portion; (iv) the neck portion has a reduced width. The flexible container includes a fitment attached to the neck portion. The fitment is composed of a polymeric composition having an Izod impact resistance from greater than 50 J/m to 500 J/m.

The present disclosure provides another flexible container. In an embodiment, a flexible container is provided and includes four panels. The four panels form (i) a body portion, (ii) a neck portion, (iii) a tapered transition portion between the body portion and the neck portion, and (iv) the neck portion has a reduced width. The flexible container is void of a rigid fitment and includes a seal in the neck portion.

BRIEF DESCRIPTION OF THE DRAWINGS

FIG. 1 is a front elevation view of a flexible container in a collapsed configuration in accordance with an embodiment of the present disclosure.

FIG. 2 is an exploded side elevation view of a panel sandwich.

FIG. 3 is a perspective view of the flexible container of FIG. 1 in an expanded configuration and in accordance with an embodiment of the present disclosure.

FIG. 4 is a bottom plan view of the expanded flexible container of FIG. 3 in accordance with an embodiment of the present disclosure.

FIG. 5 is a top plan view of the flexible container of FIG. 3.

FIG. 6 is an enlarged view of area 6 of FIG. 1

FIG. 7 is a perspective view of a mandrel and a fitment in accordance with an embodiment of the present disclosure.

FIG. 8 is a perspective view of a mandrel supporting a fitment in accordance with an embodiment of the present disclosure.

FIGS. 14-15 are perspective views of a scoring device in accordance with an embodiment of the present disclosure.

FIG. 16 is a perspective view of an excess flare portion in accordance with an embodiment of the present disclosure.

FIG. 18 is a perspective view of a flexible container with a neck seal in accordance with an embodiment of the present disclosure.

FIG. 19 is a perspective view of a flexible container with a flare seal in accordance with an embodiment of the present disclosure.

DETAILED DESCRIPTION

Figure 9:
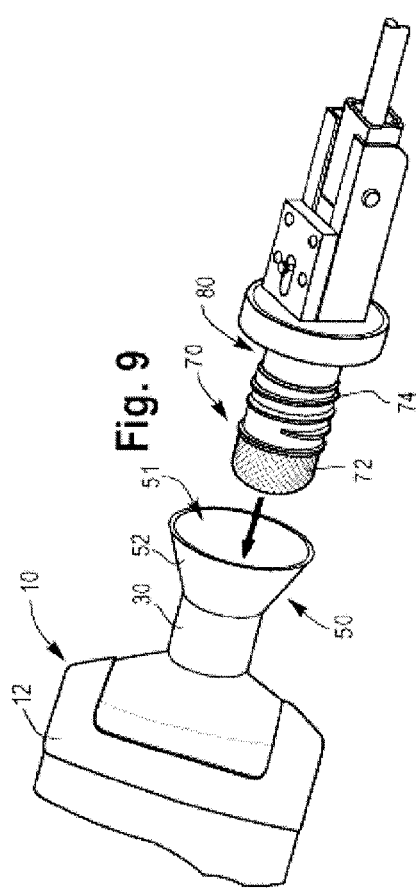
FIG. 9 is a perspective view of a fitment being inserted into the expanded end of the flare portion in accordance with an embodiment of the present disclosure.

The present disclosure provides a process and a flexible container produced from the process. In an embodiment, the process includes (A) providing a flexible container with four panels. The four panels form (i) a body portion; (ii) a neck portion, and a flare portion that extends from the neck portion; (iii) a tapered transition portion between the body portion and the neck portion; and (iv) the neck portion has a reduced width, the flare portion has an expanded end; and the width of the flare portion gradually increases from the neck portion to the flare expanded end (i.e., the expanded end of the flare portion). The process includes (B) inserting a fitment into the flare portion from the expanded end.

1. Flexible Container

The process includes providing a flexible container 10. Flexible container 10 has a collapsed configuration (as shown in FIG. 1) and has an expanded configuration (shown in FIGS. 3, 4, 5). FIG. 1 shows the flexible container 10 having a bottom section I, a body section II, a tapered transition section III, a neck section IV, and a flare section V. In the expanded configuration, the bottom section I forms a bottom segment 26. The body section II forms a body portion. The tapered transition section III forms a tapered transition portion. The neck section IV forms a neck portion. The flare section V forms a flare portion.

The flexible container 10 is made from four panels. During the fabrication process, the panels are formed when one or more webs of film material are sealed together. While the webs may be separate pieces of film material, it will be appreciated that any number of the seams between the webs could be "pre-made," as by folding one or more of the source webs to create the effect of a seam or seams. For example, if it were desired to fabricate the present flexible container from two webs instead of four, the bottom, left center, and right center webs could be a single folded web, instead of three separate webs. Similarly, one, two, or more webs may be used to produce each respective panel (i.e., a bag-in-a-bag configuration or a bladder configuration).

FIG. 2 shows the relative positions of the four webs as they form four panels (in a "one up" configuration) as they pass through the fabrication process. For clarity, the webs are shown as four individual panels, the panels separated and the heat seals not made. The constituent webs form first gusset panel 18, second gusset panel 20, front panel 22 and rear panel 24. The panels 18-24 are a multilayer film as discussed in detail below. The gusset fold lines 60 and 62 are shown in FIGS. 1 and 2.

As shown in FIG. 2, the folded gusset panels 18, 20 are placed between the rear panel 24 and the front panel 22 to form a "panel sandwich." The gusset panel 18 opposes the gusset panel 20. The edges of the panels 18-24 are configured, or otherwise arranged, to form a common periphery 11 as shown in FIG. 1. The flexible multilayer film of each panel web is configured so that the heat seal layers face each other. The common periphery 11 includes the bottom seal area including the bottom end of each panel.

When the container 10 is in the collapsed configuration, the flexible container is in a flattened, or in an otherwise evacuated state. The gusset panels 18, 20 fold inwardly (dotted gusset fold lines 60, 62 of FIG. 1) and are sandwiched by the front panel 22 and the rear panel 24.

FIGS. 3-5 show flexible container 10 in the expanded configuration. The flexible container 10 has four panels, a front panel 22, a back panel 24, a first gusset panel 18 and a second gusset panel 20. The four panels 18, 20, 22, and 24 form the body section II and extend toward a top end 44 and extend toward a bottom end 46 of the container 10. Sections III, IV, and V (respective tapered transition section, neck section, and flare section) form a top segment 28. Section I (bottom section) forms a bottom segment 26.

The four panels 18, 20, 22 and 24 can each be composed of a separate web of film material. The composition and structure for each web of film material can be the same or different. Alternatively, one web of film material may also be used to make all four panels and the top and bottom segments. In a further embodiment, two or more webs can be used to make each panel.

In an embodiment, four webs of film material are provided, one web of film for each respective panel 18, 20, 22, and 24. The process includes sealing edges of each film to the adjacent web of film to form peripheral seals 41 (FIGS. 1, 3, 4, 5). The peripheral tapered seals 40a-40d are located on the bottom segment 26 of the container as shown in FIG. 4. The peripheral seals 41 are located on the side edges of the container 10. Consequently the process includes forming a closed bottom section I, a closed body section II, and a closed tapered transition section III.

To form the top segment 28 and the bottom segment 26, the four webs of film converge together at the respective end and are sealed together. For instance, the top segment 28 can be defined by extensions of the panels sealed together at the tapered transition section III, the neck section IV, and the flare section V. The top end 44 includes four top panels 28a-28d (FIG. 5) of film that define the top segment 28. The bottom segment 26 can be defined by extensions of the panels sealed together at the bottom section I. The bottom segment 26 can also have four bottom panels 26a-26d of film sealed together and can also be defined by extensions of the panels at the opposite end 46 as shown in FIG. 4.

The neck portion can extend from the transition portion. Alternatively, the neck portion can extend from one of the four panels of the body portion, or from a corner of the body portion.

In an embodiment, the neck 30 is positioned at a midpoint of the top segment 28. The neck 30 may (or may not) be sized smaller than a width of the body section III, such that the neck 30 can have an area that is less than a total area of the top segment 28. The location of the neck 30 can be anywhere on the top segment 28 of the container 10.

In an embodiment, the neck is formed from two or more panels. In a further embodiment, the neck 30 is formed from four panels.

Although FIGS. 1 and 3 show the flexible container 10 with a top handle 12 and a bottom handle 14, it is understood the flexible container may be fabricated without handles or with only one handle. When the flexible container has a top handle, the neck is preferably located on the top segment between the handle legs to facilitate easy pouring.

In an embodiment, the neck 30 is located in the top segment 28 and is centered between the legs 13 of the top handle 12.

The four panels of film that form the flexible container 10 extend from the body section II (forming body portion 47), to the tapered transition section III (forming tapered transition portion 48), to form a neck portion 30 (in the neck section IV) and a flare portion 50 (in the flare section V). The four panels of film also extend from the body section II to the bottom section I (forming bottom portion 49). When the flexible container 10 is in the collapsed configuration (FIG. 1), the neck portion 30 has a width that is less than the width of the tapered transition section III, includes the neck portion has a "reduced width." The flare portion 50 extends from the neck portion 30. FIGS. 1 and 3 show the flare portion 50 and the neck portion 30 form an access opening into the flexible container interior. As shown in FIGS. 1, 3 and 5, the flare portion 50 has an expanded end 51 and the width of the flare portion 50 gradually increases from the neck portion 30 to the expanded end 51. The flare sides 52 extend outwardly toward the handle legs 13, 15 when moving from the neck portion 30 to the expanded end 51. The panels are sealed together to form a closed bottom section, a closed body section, and a closed tapered transition section. Nonlimiting examples of suitable heating procedures include heat sealing and/or ultrasonic sealing. When the container 10 is in the expanded configuration, the expanded end 51 of the flare portion 50 is open or is otherwise unsealed. When the flexible container 10 is in the collapsed configuration, the expanded end 51 is unsealed and is openable. The open expanded end 51 permits access to the container interior through the flare portion 50 and the neck portion 30 as shown in FIGS. 3 and 5.

The expanded end 51 has a width G having a length that is greater than a width F of the neck portion 30, as shown in FIG. 1. In an embodiment, the length of width G (in millimeters, mm) is from 1.1, or 1.2, or 1.5, or 2.0, or 3.0, or 4.0 to 5.0, or 6.0, or 7.0, or 8.0 times greater than the length of width F.

When the flexible container 10 is in the expanded configuration (as shown in FIG. 3), the flare portion 50 defines a frustoconical-shaped inner volume whereby the diameter of the flare portion 50 increases gradually when moving from the neck portion 30 to the expanded end 51.

As shown in FIGS. 1, 3-4, the flexible bottom handle 14 can be positioned at a bottom end 46 of the container 10 such that the bottom handle 14 is an extension of the bottom segment 26.

Each panel includes a respective bottom face. FIG. 4 shows four triangle-shaped bottom faces 26a-26d, each bottom face being an extension of a respective film panel. The bottom faces 26a-26d make up the bottom segment 26. The four panels 26a-26d come together at a midpoint of the bottom segment 26. The bottom faces 26a-26d are sealed together, such as by using a heat-sealing technology, to form the bottom handle 14. For instance, a weld can be made to form the bottom handle 14, and to seal the edges of the bottom segment 26 together. Nonlimiting examples of suitable heat-sealing technologies include hot bar sealing, hot die sealing, impulse sealing, high frequency sealing, or ultrasonic sealing methods.

FIG. 4 shows bottom segment 26. Each panel 18, 20, 22, 24 has a respective bottom face 26a-26d that is present in the bottom segment 26. Each bottom face is bordered by two opposing peripheral tapered seals 40a-40d. Each peripheral tapered seal 40a-40d extends from a respective peripheral seal 41. The peripheral tapered seals for the front panel 22 and the rear panel 24 have an inner edge 29a-29d (FIG. 4) and an outer edge 31 (FIG. 6). The peripheral tapered seals 40a-40d converge at a bottom seal area 33 (FIG. 1, FIG. 4, FIG. 6).

The front panel bottom face 26a includes a first line A defined by the inner edge 29a of the first peripheral tapered seal 40a and a second line B defined by the inner edge 29b of the second peripheral tapered seal 40b. The first line A intersects the second line B at an apex point 35a in the bottom seal area 33. The front panel bottom face 26a has a bottom distalmost inner seal point 37a ("BDISP 37a"). The BDISP 37a is located on the inner edge.

The apex point 35a is separated from the BDISP 37a by a distance S from 0 millimeter (mm) to less than 8.0 mm.

In an embodiment, the rear panel bottom face 26c includes an apex point similar to the apex point on the front panel bottom face. The rear panel bottom face 26c includes a first line C defined by the inner edge of the 29c first peripheral tapered seal 40c and a second line D defined by the inner edge 29d of the second peripheral tapered seal 40d. The first line C intersects the second line D at an apex point 35c in the bottom seal area 33. The rear panel bottom face 26c has a bottom distalmost inner seal point 37c ("BDISP 37c"). The BDISP 37c is located on the inner edge. The apex point 35c is separated from the BDISP 37c by a distance T from 0 millimeter (mm) to less than 8.0 mm.

It is understood the following description to the front panel bottom face applies equally to the rear panel bottom face, with reference numerals to the rear panel bottom face shown in adjacent closed parentheses.

In an embodiment, the BDISP 37a (37c) is located where the inner edges 29a (29c) and 29b (29d) intersect. The distance between the BDISP 37a (37c) and the apex point 35a (35c) is 0 mm.

In an embodiment, the inner seal edge diverges from the inner edges 29a, 29b (29c, 29d), to form an inner seal arc 39a (front panel) and inner seal arc 39c (rear panel) as shown in FIGS. 4 and 8. The BDISP 37a (37c) is located on the inner seal arc 39a (39c). The apex point 35a (apex point 35c) is separated from the BDISP 37a (BDISP 37c) by the distance S (distance T) which is from greater than 0 mm, or 1.0 mm, or 2.0 mm, or 2.6 mm, or 3.0 mm, or 3.5 mm, or 3.9 mm, to 4.0 mm, or 4.5 mm, or 5.0 mm, or 5.2 mm, or 5.3 mm, or 5.5 mm, or 6.0 mm, or 6.5 mm, or 7.0 mm, or 7.5 mm, or 7.9 mm.

In an embodiment, apex point 35a (35c) is separated from the BDISP 37a (37c) by the distance S (distance T) which is from greater than 0 mm to less than 6.0 mm.

In an embodiment, the distance from S (distance T) from the apex point 35a (35c) to the BDISP 37a (37c) is from greater than 0 mm, or 0.5 mm or 1.0 mm, or 2.0 mm to 4.0 mm or 5.0 mm or less than 5.5 mm.

In an embodiment, apex point 35a (apex point 35c) is separated from the BDISP 37a (BDISP 37c) by the distance S (distance T) which is from 3.0 mm, or 3.5 mm, or 3.9 mm, to 4.0 mm, or 4.5 mm, or 5.0 mm, or 5.2 mm, or 5.3 mm, or 5.5 mm.

In an embodiment, the distal inner seal arc 39a (39c) has a radius of curvature from 0 mm, or greater than 0 mm, or 1.0 mm to 19.0 mm, or 20.0 mm.

In an embodiment, each peripheral tapered seal 40a-40d (outside edge) and an extended line from respective peripheral seal 41 (outside edge) form an angle G as shown in FIG. 1. The angle G is from 40° or 42°, or 44°, or 45° to 46°, or 48, or 50°. In an embodiment, angle G is 45°.

The bottom segment 26 includes a pair of gussets 54 and 56 formed thereat, which are essentially extensions of the bottom faces 26a-26d. The gussets 54 and 56 can facilitate the ability of the flexible container 10 to stand upright. These gussets 54 and 56 are formed from excess material from each bottom face 26a-26d that are joined together to form the gussets 54 and 56. The triangular portions of the gussets 54 and 56 comprise two adjacent bottom segment panels sealed together and extending into its respective gusset. For example, adjacent bottom faces 26a and 26d extend beyond the plane of their bottom surface along an intersecting edge and are sealed together to form one side of a first gusset 54. Similarly, adjacent bottom faces 26c and 26d extend beyond the plane of their bottom surface along an intersecting edge and are sealed together to form the other side of the first gusset 54. Likewise, a second gusset 56 is similarly formed from adjacent bottom faces 26a-26b and 26b-26c. The gussets 54 and 56 can contact a portion of the bottom segment 26, where the gusset portions gussets 54 and 56 can contact bottom faces 26*b* and 26*d* covering them, while bottom segment panels 26*a* and 26*c* remain exposed at the bottom end 46.

As shown in FIGS. 3-4, the gussets 54 and 56 of the flexible container 10 can further extend into the bottom handle 14. In the aspect where the gussets 54 and 56 are positioned adjacent bottom segment panels 26*b* and 26*d*, the bottom handle 14 can also extend across bottom faces 26*b* and 26*d*, extending between the pair of panels 18 and 20. The bottom handle 14 can be positioned along a center portion or midpoint of the bottom segment 26 between the front panel 22 and the rear panel 24.

The top handle 12 and the bottom handle 14 can comprise up to four plys of film sealed together for a four panel container 10. When more than four panels are used to make the container, the handles can include the same number of panels used to produce the container. Any portion of the handles 12, 14 where all four plys are not completely sealed together by the heat-sealing method, can be adhered together in any appropriate manner, such as by a tack seal to form a fully-sealed multilayer handle. Alternatively, the top handle can be made from as few as a single ply of film from one panel only or can be made from only two plies of film from two panels. The handles 12, 14 can have any suitable shape and generally will take the shape of the film end. For example, typically the web of film has a rectangular shape when unwound, such that its ends have a straight edge. Therefore, the handles 12, 14 would also have a rectangular shape.

Additionally, the bottom handle 14 can contain a handle opening 16 or cutout section therein sized to fit a user's hand, as can be seen in FIG. 1. The handle opening 16 can be any shape that is convenient to fit the hand and, in one aspect, the handle opening 16 can have a generally oval shape. In another aspect, the handle opening 16 can have a generally rectangular shape. Additionally, the handle opening 16 of the bottom handle 14 can also have a flap 38 that comprises the cut material that forms the handle opening 16. To define the handle opening 16, the handle 14 can have a section that is cut out of the multilayer handle 14 along three sides or portions while remaining attached at a fourth side or lower portion. This provides a flap of material 38 that can be pushed through the opening 16 by the user and folded over an edge of the handle opening 16 to provide a relatively smooth gripping surface at an edge that contacts the user's hand. If the flap of material were completely cut out, this would leave an exposed fourth side or lower edge that could be relatively sharp and could possibly cut or scratch the hand when placed there.

Furthermore, a portion of the bottom handle 14 attached to the bottom segment 26 can contain a dead machine fold 42 or a score line that provides for the handle 14 to consistently fold in the same direction, as illustrated in FIG. 3. The machine fold 42 can comprise a fold line that permits folding in a first direction toward the front side panel 22 and restricts folding in a second direction toward the rear panel 24. The term "restricts" as used throughout this application can mean that it is easier to move in one direction, or the first direction, than in an opposite direction, such as the second direction. The machine fold 42 can cause the handle 14 to consistently fold in the first direction because it can be thought of as providing a generally permanent fold line in the handle that is predisposed to fold in the first direction X, rather than in the second direction Y. This machine fold 42 of the bottom handle 14 can serve multiple purposes, one being that when a user is transferring the product from the container 10 they can grasp the bottom handle 14 and it will easily bend in the first direction X to assist in pouring. Secondly, when the flexible container 10 is stored in an upright position, the machine fold 42 in the bottom handle 14 encourages the handle 14 to fold in the first direction X along the machine fold 42, such that the bottom handle 14 can fold underneath the container 10 adjacent one of the bottom segment panels 26*a*, as shown in FIG. 4. The weight of the product can also apply a force to the bottom handle 14, such that the weight of the product can further press on the handle 14 and maintain the handle 14 in the folded position in the first direction X. As will be discussed herein, the top handle 12 can also contain a similar machine fold that also allows it to fold consistently in the same first direction X as the bottom handle 14.

Additionally, as the flexible container 10 is evacuated and less product remains, the bottom handle 14 can continue to provide support to help the flexible container 10 to remain standing upright unsupported and without tipping over. Because the bottom handle 14 is sealed generally along its entire length extending between the pair of gusset panels 18 and 20, it can help to keep the gussets 54 and 56 (FIG. 1, FIG. 3) together and continue to provide support to stand the container 10 upright even as the container 10 is emptied.

As seen in FIGS. 1, 3, and 5, the top handle 12 can extend from the top segment 28 and, in particular, can extend from the four panels 28*a*-28*d* that make up the top segment 28. The four panels 28*a*-28*d* of film that extend into the top handle 12 are all sealed together to form a multi-layer top handle 12. The top handle 12 can have a U-shape and, in particular, an upside down U-shape with a horizontal upper handle portion 12*a* having two pairs of spaced legs 13 and 15 extending therefrom. The pair of legs 13 and 15 extend from the top segment 28, adjacent the neck portion 30.

A portion of the top handle 12 can extend above the neck portion 30 and above the top segment 28 when the handle 12 is extended in a position perpendicular to the top segment 28 and, in particular, the entire upper handle portion 12*a* can be above the flare portion 50 and the top segment 28. The two pairs of legs 13 and 15 along with the upper handle portion 12*a* together make up the handle 12 surrounding a handle opening that allows a user to place their hand therethrough and grasp the upper handle portion 12*a* of the handle 12.

As with the bottom handle 14, the top handle 12 also can have a dead machine fold that permits folding in a first direction toward the front side panel 22 and restricts folding in a second direction toward the rear side panel 24. The machine fold can be located in each of the pair of legs 13, 15 at a location where the seal begins. The handle 12 can be adhered together, such as with a tack adhesive, for example. The machine fold in the handle 12 can allow for the handle 12 to be inclined to fold or bend consistently in the same first direction X as the bottom handle 14, rather than in the second direction Y. As shown in FIGS. 1, 3, and 5, the handle 12 can likewise contain a flap portion 36, that folds upwards toward the upper handle portion 12*a* of the handle 12 to create a smooth gripping surface of the handle 12, as with the bottom handle 14, such that the handle material is not sharp and can protect the user's hand from getting cut on any sharp edges of the handle 12.

In an embodiment, either top handle 12 or bottom handle 14 can be "a punch-out handle," that is, a handle formed by a process the cuts out or "punches" film material from the flexile container, thereby removing film material from the flexible container. The punch-out handle does not have, or is otherwise void of, flap portion 36 (for top handle 12) and/or flap portion 38 (for bottom handle 14).

In an embodiment, a grip member can be attached to either the top handle 12 or the bottom handle 14. The grip member can be placed around top handle 12 and/or bottom handle 14. Grip member can also be molded into the flexible container. The grip member can be adhesively attached to any portion of the flexible container. The grip member provides additional comfort to the user when carrying, or otherwise using, the flexible container. The grip member provides additional reinforcement to the flexible container. In a further embodiment, the grip member can be removed from the flexible container 10 after use and be re-used with another flexible container.

When the container 10 is in a rest position, such as when it is standing upright on its bottom segment 26, as shown in FIG. 3, the bottom handle 14 can be folded underneath the container 10 along the bottom machine fold 42 in the first direction X, so that it is parallel to the bottom segment 26 and adjacent bottom panel 26a, and the top handle 12 will automatically fold along Its machine fold in the same first direction X, with a front surface of the handle 12 parallel to a top section or panel 28a of the top segment 28. The top handle 12 folds in the first direction X, rather than extending straight up, perpendicular to the top segment 28, because of the machine fold. Both handles 12 and 14 are inclined to fold in the same direction X, such that upon dispensing, the handles can fold the same direction, relatively parallel to its respective end panel or end segment, to make dispensing easier and more controlled. Therefore, in a rest position, the handles 12 and 14 are both folded generally parallel to one another. Additionally, the container 10 can stand upright even with the bottom handle 14 positioned underneath the upright container 10.

The material of construction of the flexible container 10 can comprise food-grade plastic. For instance, nylon, polypropylene, polyethylene such as high density polyethylene (HDPE) and/or low density polyethylene (LDPE) may be used as discussed later. The film of the plastic container 10 can have a thickness and barrier properties that is adequate to maintain product and package integrity during manufacturing, distribution, product shelf life and customer usage.

In an embodiment, the flexible multilayer film has a thickness from 100 micrometers, or 200 micrometers, or 250 micrometers to 300 micrometers, or 350 micrometers, or 400 micrometers. In an embodiment, the film material provides the appropriate atmosphere within the flexible container 10 to maintain the product shelf life of at least about 180 days. Such films can comprise an oxygen barrier film, such as a film having a low oxygen transmission rate (OTR) from greater than 0 to 0.4 $cc/m^2/atm/24$ hrs at 23° C. and 80% relative humidity (RH). Additionally, the flexible multilayer film can also comprise a water vapor barrier film, such as a film having a low water vapor transmission rate (WVTR) from greater than 0 to 15 $g/m^2/24$ hrs at 38° C. and 90% RH. Moreover, it may be desirable to use materials of construction having oil and/or chemical resistance particularly in the seal layer, but not limited to just the seal layer. The flexible multilayer film can be either printable or compatible to receive a pressure sensitive label or other type of label for displaying of indicia on the flexible container 10.

In an embodiment the film can also be made of non-food grade resins for producing containers for materials other than food.

In an embodiment, each panel is made from a flexible multilayer film having at least one, or at least two, or at least three layers. The flexible multilayer film is resilient, flexible, deformable, and pliable. The structure and composition of the flexible multilayer film for each panel may be the same or different. For example, each of the four panels can be made from a separate web, each web having a unique structure and/or unique composition, finish, or print. Alternatively, each of the four panels can be the same structure and the same composition.

In an embodiment, each panel 18, 20, 22, 24 is a flexible multilayer film having the same structure and the same composition.

The flexible multilayer film may be (i) a coextruded multilayer structure or (ii) a laminate, or (iii) a combination of (i) and (ii). In an embodiment, the flexible multilayer film has at least three layers: a seal layer, an outer layer, and a tie layer between. The tie layer adjoins the seal layer to the outer layer. The flexible multilayer film may include one or more optional inner layers disposed between the seal layer and the outer layer.

In an embodiment, the flexible multilayer film is a coextruded film having at least two, or three, or four, or five, or six, or seven to eight, or nine, or 10, or 11, or more layers. Some methods, for example, used to construct films are by cast co-extrusion or blown co-extrusion methods, adhesive lamination, extrusion lamination, thermal lamination, and coatings such as vapor deposition. Combinations of these methods are also possible. Film layers can comprise, in addition to the polymeric materials, additives such as stabilizers, slip additives, antiblocking additives, process aids, clarifiers, nucleators, pigments or colorants, fillers and reinforcing agents, and the like as commonly used in the packaging industry. It is particularly useful to choose additives and polymeric materials that have suitable organoleptic and or optical properties.

In another embodiment, the flexible multilayer film can comprise a bladder wherein two or more films that are adhered in such a manner as to allow some delamination of one or more plies to occur during a significant impact such that the inside film maintains integrity and continues to hold contents of the container.

Nonlimiting examples of suitable polymeric materials for the seal layer include olefin-based polymer (including any ethylene/$C_3$-$C_{10}$ α-olefin copolymers linear or branched), propylene-based polymer (including plastomer and elastomer, random propylene copolymer, propylene homopolymer, and propylene impact copolymer), ethylene-based polymer (including plastomer and elastomer, high density polyethylene ("HDPE"), low density polyethylene ("LDPE"), linear low density polyethylene ("LLDPE"), medium density polyethylene ("MDPE"), ethylene-acrylic acid or ethylene-methacrylic acid and their ionomers with zinc, sodium, lithium, potassium, magnesium salts, ethylene vinyl acetate copolymers and blends thereof.

Nonlimiting examples of suitable polymeric material for the outer layer include those used to make biaxially or monoaxially oriented films for lamination as well as coextruded films. Some nonlimiting polymeric material examples are biaxially oriented polyethylene terephthalate (OPET), monoaxially oriented nylon (MON), biaxially oriented nylon (BON), and biaxially oriented polypropylene (BOPP). Other polymeric materials useful in constructing film layers for structural benefit are polypropylenes (such as propylene homopolymer, random propylene copolymer, propylene impact copolymer, thermoplastic polypropylene (TPO) and the like, propylene-based plastomers (e.g., VERSIFY™ or VISTAMAX™)), polyamides (such as Nylon 6, Nylon 6,6, Nylon 6,66, Nylon 6,12, Nylon 12 etc.), polyethylene norbornene, cyclic olefin copolymers, polyacrylonitrile, polyesters, copolyesters (such as PETG), cellulose esters, polyethylene and copolymers of ethylene (e.g., LLDPE based on ethylene octene copolymer such as DOWLEX™, blends thereof, and multilayer combinations thereof.

Nonlimiting examples of suitable polymeric materials for tie layer include functionalized ethylene-based polymers such as ethylene-vinyl acetate ("EVA"), polymers with maleic anhydride-grafted to polyolefins such as any polyethylene, ethylene-copolymers, or polypropylene, and ethylene acrylate copolymers such an ethylene methyl acrylate ("EMA"), glycidyl containing ethylene copolymers, propylene and ethylene based olefin block copolymers INFUSE™ Olefin Block Copolymers available for the Dow Chemical Company and INTUNE™ (PP-based Olefin Block Copolymers available from The Dow Chemical Company, and blends thereof.

The flexible multilayer film may include additional layers which may contribute to the structural integrity or provide specific properties. The additional layers may be added by direct means or by using appropriate tie layers to the adjacent polymer layers. Polymers which may provide additional mechanical performance such as stiffness or opacity, as well polymers which may offer gas barrier properties or chemical resistance can be added to the structure.

Nonlimiting examples of suitable material for the optional barrier layer include copolymers of vinylidene chloride and methyl acrylate, methyl methacrylate or vinyl chloride (e.g., SARAN resins available from The Dow Chemical Company); vinylethylene vinyl alcohol (EVOH), metal foil (such as aluminum foil). Alternatively, modified polymeric films such as vapor deposited aluminum or silicon oxide on such films as BON, OPET, or OPP, can be used to obtain barrier properties when used in laminate multilayer film.

In an embodiment, the flexible multilayer film includes a seal layer selected from LLDPE (sold under the trade name DOWLEX™ (The Dow Chemical Company)), single-site LLDPE substantially linear, or linear ethylene alpha-olefin copolymers, including polymers sold under the trade name AFFINITY™ or ELITE™ (The Dow Chemical Company) for example, propylene-based plastomers or elastomers such as VERSIFY™ (The Dow Chemical Company), and blends thereof. An optional tie layer is selected from either ethylene-based olefin block copolymer PE-OBC (sold as INFUSE™) or propylene-based olefin block copolymer PP-OBC (sold as INTUNE™). The outer layer includes greater than 50 wt % of resin(s) having a melting point, Tm, that is from 25° C., to 30° C., or 40° C. or higher than the melting point of the polymer in the seal layer wherein the outer layer polymer is selected from resins such as VERSIFY or VISTAMAX, ELITE™, HDPE or a propylene-based polymer such as propylene homopolymer, propylene impact copolymer or TPO.

In an embodiment, the flexible multilayer film is co-extruded.

In an embodiment, flexible multilayer film includes a seal layer selected from LLDPE (sold under the trade name DOWLEX™ (The Dow Chemical Company)), single-site LLDPE (substantially linear, or linear, olefin polymers, including polymers sold under the trade name AFFINITY™ or ELITE™ (The Dow Chemical Company) for example, propylene-based plastomers or elastomers such as VERSIFY™ (The Dow Chemical Company), and blends thereof. The flexible multilayer film also includes an outer layer that is a polyamide.

In an embodiment, the flexible multilayer film is a coextruded film and includes:

(i) a seal layer composed of an olefin-based polymer having a first melt temperature less than 105° C., (Tm1); and (ii) an outer layer composed of a polymeric material having a second melt temperature, (Tm2), wherein Tm2−Tm1>40° C.

The term "Tm2−Tm1" is the difference between the melt temperature of the polymer in the outer layer and the melt temperature of the polymer in the seal layer, and is also referred to as "ΔTm." In an embodiment, the ΔTm is from 41° C., or 50° C., or 75° C., or 100° C., to 125° C., or 150° C., or 175° C., or 200° C.

In an embodiment, the flexible multilayer film is a coextruded film, the seal layer is composed of an ethylene-based polymer, such as a linear or a substantially linear polymer, or a single-site catalyzed linear or substantially linear polymer of ethylene and an alpha-olefin monomer such as 1-butene, 1-hexene or 1-octene, having a Tm from 55° C. to 115° C. and a density from 0.865 to 0.925 $g/cm^3$, or from 0.875 to 0.910 $g/cm^3$, or from 0.888 to 0.900 $g/cm^3$ and the outer layer is composed of a polyamide having a Tm from 170° C. to 270° C.

In an embodiment, the flexible multilayer film is a coextruded film having at least five layers, the coextruded film having a seal layer composed of an ethylene-based polymer, such as a linear or substantially linear polymer, or a single-site catalyzed linear or substantially linear polymer of ethylene and an alpha-olefin comonomer such as 1-butene, 1-hexene or 1-octene, the ethylene-based polymer having a Tm from 55° C. to 115° C. and density from 0.865 to 0.925 $g/cm^3$, or from 0.875 to 0.910 $g/cm^3$, or from 0.888 to 0.900 $g/cm^3$ and an outermost layer composed of a polyamide having a Tm from 170° C. to 270° C.

In an embodiment, the flexible multilayer film is a coextruded film having at least seven layers. The seal layer is composed of an ethylene-based polymer, such as a linear or substantially linear polymer, or a single-site catalyzed linear or substantially linear polymer of ethylene and an alpha-olefin comonomer such as 1-butene, 1-hexene or 1-octene, the ethylene-based polymer having a Tm from 55° C. to 115° C. and density from 0.865 to 0.925 $g/cm^3$, or from 0.875 to 0.910 $g/cm^3$, or from 0.888 to 0.900 $g/cm^3$. The outer layer is a polyamide having a Tm from 170° C. to 270° C.

In an embodiment, the flexible multilayer film includes a seal layer composed of an ethylene-based polymer, or a linear or substantially linear polymer, or a single-site catalyzed linear or substantially linear polymer of ethylene and an alpha-olefin monomer such as 1-butene, 1-hexene or 1-octene, having a heat seal initiation temperature (HSIT) from 65° C. to less than 125° C. Applicant discovered that the seal layer with an ethylene-based polymer with a HSIT from 65° C. to less than 125° C. advantageously enables the formation of secure seals and secure sealed edges around the complex perimeter of the flexible container. The ethylene-based polymer with HSIT from 65° C. to less than 125° C. is a robust sealant which also allows for better sealing to the rigid fitment which is prone to failure. The ethylene-based polymer with HSIT from 65° C. to 125° C. enables lower heat sealing pressure/temperature during container fabrication. Lower heat seal pressure/temperature results in lower stress at the fold points of the gusset, and lower stress at the union of the films in the top segment and in the bottom segment. This improves film integrity by reducing wrinkling during the container fabrication. Reducing stresses at the folds and seams improves the finished container mechanical performance. The low HSIT ethylene-based polymer seals at a temperature below what would cause the outer layer to be compromised.

In an embodiment, the flexible multilayer film is a coextruded five layer film, or a coextruded seven layer film having at least two layers containing an ethylene-based polymer. The ethylene-based polymer may be the same or different in each layer.

In an embodiment, the flexible multilayer film is a coextruded five layer, or a coextruded seven layer film having at least two layers containing a polyamide polymer.

In an embodiment, the flexible multilayer film is a seven-layer coextruded film with a seal layer composed of an ethylene-based polymer, or a linear or substantially linear polymer, or a single-site catalyzed linear or substantially linear polymer of ethylene and an alpha-olefin monomer such as 1-butene, 1-hexene or 1-octene, having a Tm from 90° C. to 104° C. The outer layer is a polyamide having a Tm from 170° C. to 270° C. The film has a ΔTm from 40° C. to 200° C. The film has an inner layer (first inner layer) composed of a second ethylene-based polymer, different than the ethylene-based polymer in the seal layer. The film has an inner layer (second inner layer) composed of a polyamide the same or different to the polyamide in the outer layer. The seven layer film has a thickness from 100 micrometers to 250 micrometers.

FIG. 6 shows an enlarged view of the bottom seal area 33 (area 6) of FIG. 1 and the front panel 26a. The fold lines 60 and 62 of respective gusset panels 18, 20 are separated by a distance U that is from 0 mm, or greater than 0 mm, or 0.5 mm, or 1.0 mm, or 2.0 mm, or 3.0 mm, or 4.0 mm, or 5.0 mm to 12.0 mm, or greater than 60.0 mm (for larger containers, for example). In an embodiment, distance U is from greater than 0 mm to less than 6.0 mm. FIG. 6 shows line A (defined by inner edge 29a) intersecting line B (defined by inner edge 29b) at apex point 35a. BDISP 37a is on the distal inner seal arc 39a. Apex point 35a is separated from BDISP 37a by S having a length from greater than 0 mm or 1.0 mm, or 2.0 mm, or 2.6 mm, or 3.0 mm, or 3.5 mm, or 3.9 mm to 4.0 mm, or 4.5 mm, or 5.0 mm, or 5.2 mm, or 5.5 mm, or 6.0 mm, or 6.5 mm, or 7.0 mm, or 7.5 mm, or 7.9 mm.

In FIG. 6, an overseal 64 is formed where the four peripheral tapered seals 40a-40d converge in the bottom seal area. The overseal 64 includes 4-ply portions 66, where a portion of each panel is heat sealed to a portion of every other panel. Each panel represents 1-ply in the 4-ply heat seal. The overseal 64 also includes a 2-ply portion 68 where two panels (front panel and rear panel) are sealed together. Consequently, the "overseal," as used herein, is the area where the peripheral tapered seals converge that is subjected to a subsequent heat seal operation (and subjected to at least two heat seal operations altogether). The overseal is located in the peripheral tapered seals and does not extend into the chamber of the flexible container 10.

In an embodiment, the apex point 35a is located above the overseal 64. The apex point 35a is separated from, and does not contact the overseal 64. The BDISP 37a is located above the overseal 64. The BDISP 37a is separated from and does not contact the overseal 64.

In an embodiment, the apex point 35a is located between the BDISP 37a and the overseal 64, wherein the overseal 64 does not contact the apex point 35a and the overseal 64 does not contact the BDISP 37a.

The distance between the apex point 35a to the top edge of the overseal 64 is defined as distance W shown in FIG. 6. In an embodiment, the distance W has a length from 0 mm, or greater than 0 mm, or 2.0 mm, or 4.0 mm to 6.0 mm, or 8.0 mm, or 10.0 mm, or 15.0 mm.

When more than four webs are used to produce the container, the portion 68 of the overseal 64 may be a 4-ply, or a 6-ply, or an 8-ply portion.

In an embodiment, the flexible container 10 has a vertical drop test pass rate from 90%, or 95% to 100%. The vertical drop test is conducted as follows. The container is filled with tap water to its nominal capacity, conditioned at 25° C. for at least 3 hours, held in upright position from its upper handle at 1.5 m height (from the base or side of the container to the ground), and released to a free fall drop onto a concrete slab floor. If any leak is detected immediately after the drop, the test is recorded as a failure. A minimum of twenty flexible containers are tested. A percentage for pass/fail containers is then calculated.

In an embodiment, the flexible container 10 has a side drop pass rate from 90%, or 95% to 100%. This side drop test is conducted as follows. The container is filled with tap water to its nominal capacity, conditioned at 25° C. for at least 3 hours, held in upright position from its upper handle. The flexible container is released on its side from a 1.5 m height to a free fall drop onto a concrete slab floor. If any leak is detected immediately after the drop, the test is recorded as failure. A minimum of twenty flexible containers are tested. A percentage for pass/fail containers is then calculated.

In an embodiment, the flexible container 10 passes the stand-up test where the package is filled with water at ambient temperature and placed on a flat surface for seven days and it should remain in the same position, with unaltered shape or position.

In an embodiment, the flexible container 10 has a volume from 0.050 liters (L), or 0.1 L, or 0.15 L, or 0.2 L, or 0.25 liters (L), or 0.5 L, or 0.75 L, or 1.0 L, or 1.5 L, or 2.5 L, or 3 L, or 3.5 L, or 4.0 L, or 4.5 L, or 5.0 L to 6.0 L, or 7.0 L, or 8.0 L, or 9.0 L, or 10.0 L, or 20 L, or 30 L.

The flexible container 10 can be used to store any number of flowable substances therein. In particular, a flowable food product can be stored within the flexible container 10. In one aspect, flowable food products such as salad dressings, sauces, dairy products, mayonnaise, mustard, ketchup, other condiments, beverages such as water, juice, milk, or syrup, carbonated beverages, beer, wine, animal feed, pet feed, and the like can be stored inside of the flexible container 10.

The flexible container 10 is suitable for storage of other flowable substances including, but not limited to, oil, paint, grease, chemicals, suspensions of solids in liquid, and solid particulate matter (powders, grains, granular solids).

The flexible container 10 is suitable for storage of flowable substances with higher viscosity and requiring application of a squeezing force to the container in order to discharge. Nonlimiting examples of such squeezable and flowable substances include grease, butter, margarine, soap, shampoo, animal feed, sauces, and baby food.

2. Fitment

The present process includes inserting a fitment into the flare portion 50 from the expanded end 51. As shown in FIGS. 7-17, the fitment 70 includes a base 72 and a closure 74. Although the base 72 has a circular cross-sectional shape, it is understood that the base 72 can have other cross-sectional shapes such as a polygonal cross-sectional shape, for example. The base 72 with circular cross-sectional shape is distinct from fitments with canoe-shaped bases used for conventional two-panel flexible pouches.

In an embodiment, the outer surface of the base 72 has surface texture. The surface texture can include embossment 73, and a plurality of radial ridges to promote sealing to the inner surface of the neck portion 30 as will be discussed below.

In an embodiment, the fitment 70 excludes fitments with oval, wing-shaped, eye-shaped, or canoe-shaped bases.

Although FIGS. 7-17 show a screw-on type closure (for use with a mated screw-on cap), it is understood that the fitment 70 may embody other closure systems. Nonlimiting examples of suitable fitments and closures, include, screw cap, flip-top cap, snap cap, liquid or beverage dispensing fitments (stop-cock or thumb plunger), Colder fitment connector, tamper evident pour spout, vertical twist cap, horizontal twist cap, aseptic cap, vitop press, press tap, push on tap, lever cap, conro fitment connector, and other types of removable (and optionally reclosable) closures. The closure and/or fitment may or may not include a gasket.

In an embodiment, the closure 74 is watertight. In a further embodiment, the closure 74 provides a hermetic seal to the container 10.

In an embodiment, the fitment 70 can be made of a rigid construction and can be formed of any appropriate plastic, such as high density polyethylene (HDPE), low density polyethylene (LDPE), polypropylene (PP), and combinations thereof. The location of the neck portion 30 can be anywhere on the top segment 28 of the container 10. In an embodiment the neck portion 30 is located at the center or midpoint of the top segment 28.

In an embodiment, the fitment is made by co-injection of a two-component structure A/B wherein A is an inside material having a melting point, Tm, greater than the Tm of an outside material B (seal side). In another embodiment, the materials A and B are different types of materials, where an optional tie layer C adheres material A to material B. In a further embodiment, the outside material B has a low coefficient of friction (COF) to facilitate fitment insertion into the neck portion 30.

In an embodiment, the fitment 70 includes a polymeric composition having an Izod impact resistance from greater than 50 Joules (J)/meter (m), or 100 J/m, or 150 J/m, or 200 J/m, or 250 J/m to 300 J/m, or 350 J/m, or 400 J/m, or 450 J/m, or 500 J/m. Izod impact resistance is measured in accordance with ASTM D 256. In a further embodiment, the fitment includes a polyolefin having an Izod impact resistance from greater than 50 J/m, or 100 J/m, or 150 J/m, or 200 J/m, or 250 J/m to 300 J/m, or 350 J/m, or 400 J/m, or 450 J/m, or 500 J/m.

In an embodiment, the fitment 70 includes a polymeric composition containing a polyolefin with a melt temperature (Tm) greater than or equal to the melt temperature of the polyolefin present in the seal layer of the multilayer film used to make the panels. When clamp heat sealing is utilized to form the seal between the base 72 and the neck portion 30, a nonlimiting example includes a fitment 70 composed of a HDPE having a Tm of 125° C. and the seal layer for the container 10 contains an LDPE with a Tm of 105° C. Another nonlimiting example is a fitment 70 composed of LLDPE with Tm of 120° C., and the container 10 has a seal layer containing an ethylene/α-olefin copolymer (AFFINITY™ PL 1140G) with a Tm 96° C.

In an embodiment, the process includes supporting the fitment 70 on a mandrel 80, and subsequently inserting the fitment 70 first into the expanded end 51, then into the flare portion 50, and then into the neck portion 30. A plurality of fitments may be fed sequentially to the mandrel 80 by an automated feed system as shown in FIGS. 7-8. FIG. 7 shows the mandrel 80 moving into position to receive and support one of a plurality of fitments 70. Although FIG. 7 shows the mandrel 80 having a length similar to the length of the closure 74, it is understood that the mandrel 80 can have a length the same as, or substantially the same as, or greater than, the length of the fitment 70. In other words, the mandrel 80 can partially support, or fully support, the fitment 70, the base 72, the closure 74, and any combination thereof.

FIG. 8 shows the fitment 70 supported on the mandrel 80. The outer diameter of the mandrel 80 is mated to the inner diameter of the fitment 70 such that the fitment 70 fits, snugly fits, or friction fits on the mandrel 80. In other words, the mandrel 80 is configured to fit into/through the closure 74, or into/through both the closure 74 and the base 72.

In an embodiment, the mandrel 80 is a component of an automated system, the mandrel a component of a movable arm as shown in FIGS. 7-16.

Figure 11:
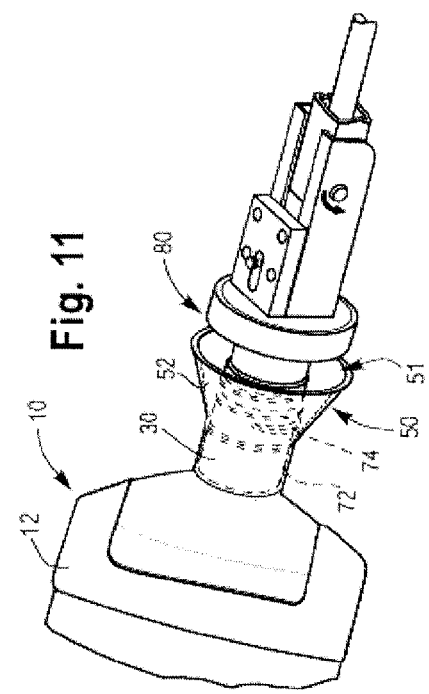
FIG. 11 is a perspective view of a fitment being inserted into the neck portion in accordance with an embodiment of the present disclosure.
Figure 10:
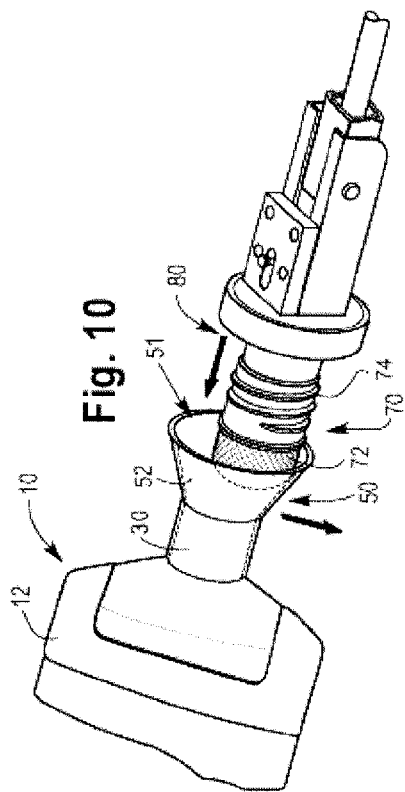
FIG. 10 is a perspective view of a fitment being inserted into the expanded end of the flare portion in accordance with an embodiment of the present disclosure.

FIG. 9 shows the fitment 70 (supported by the mandrel 80) approaching the expanded end 51 of the flare portion 50. FIG. 10 shows the fitment 70 (supported by the mandrel 80) entering through, or otherwise inserting into, the expanded end 51 and into the flare portion 50. In FIG. 11, the fitment 70 (supported by the mandrel 80) continues to move, and continues to enter into, or continues to insert into, the neck portion 30. In an embodiment, the outer diameter of the base 72 is the same as, or slightly less than, the inner diameter of the neck portion 30 such that the base 72 snugly fits, or otherwise friction fits, into the neck portion 30.

Although FIGS. 7-11 show the mandrel 80 (with fitment 70) moving toward the flexible container 10, it is understood that the flexible container 10 may be moved toward the mandrel 80 (supporting the fitment 70), the mandrel 80 being stationary, or intermittently stationary and intermittently movable, during the insertion process. Alternatively, the process may entail a system whereby the flexible container 10 and the mandrel 80 each is movable with respect to the other, such that the flexible container 10 and the fitment 70 (supported by the mandrel 80) can each be moved toward and away from the other in order to insert the fitment 70 into the expanded end 51, through the flare portion 50, and into the neck portion 30.

In an embodiment, the process includes adjoining the fitment 70 to the neck portion 30. As shown in FIG. 11, the base 72 of the fitment 70 is inserted into the neck portion 30, with the outer surface of the base 72 adjoined to the inner surface of the base 72 by way of friction fit, compression fit, an adhesive composition, and combinations thereof.

Figure 13:
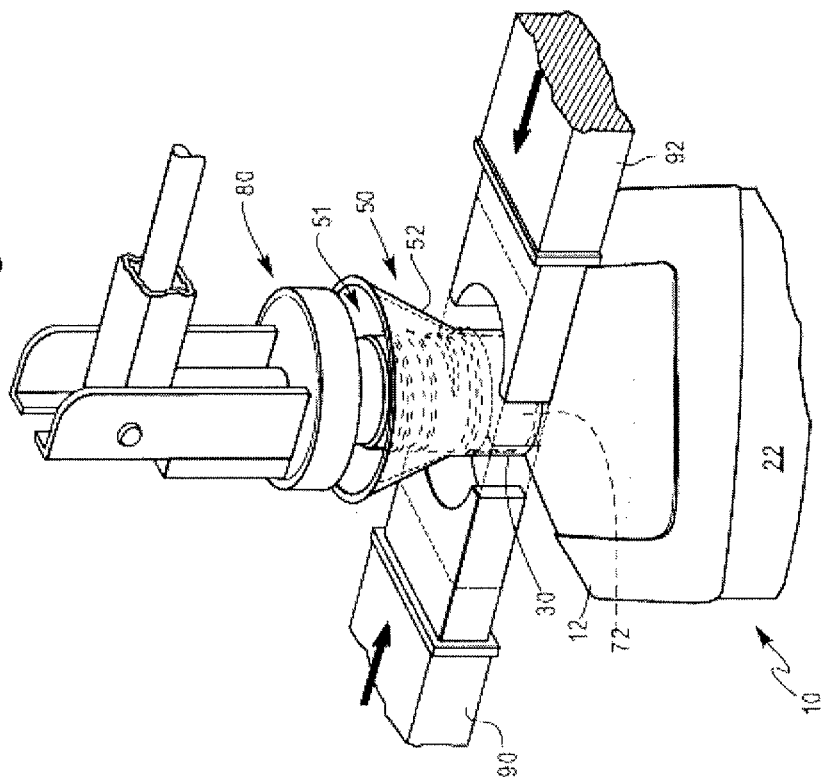
FIG. 13 is a perspective view of the fitment being sealed to the neck portion in accordance with an embodiment of the present disclosure.
Figure 12:
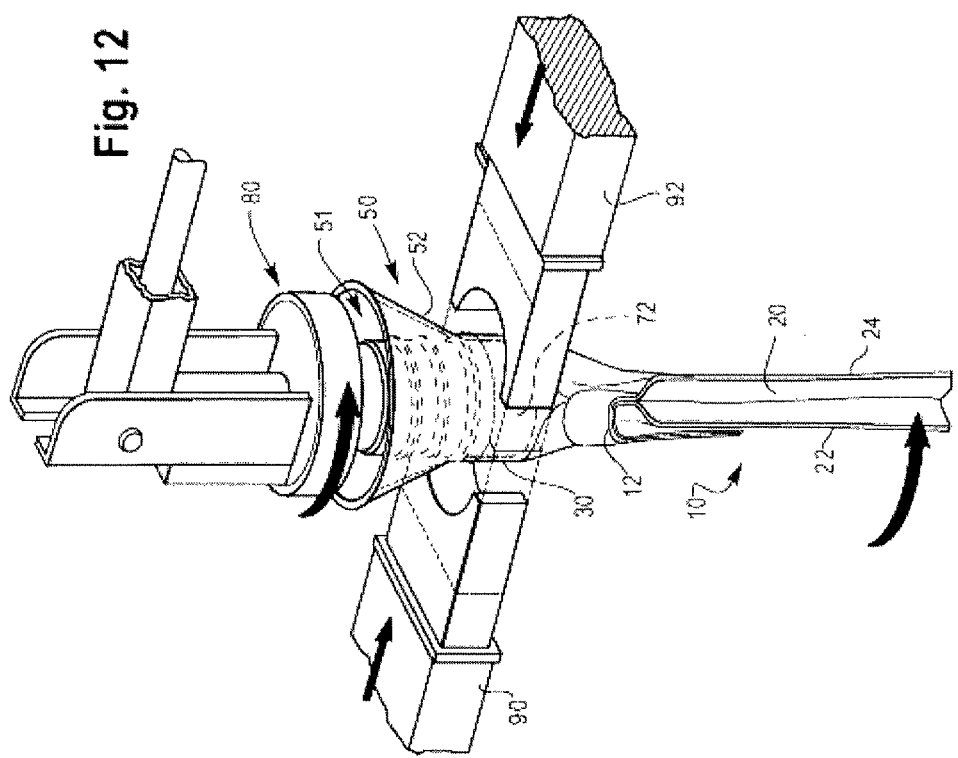
FIG. 12 is a perspective view of the fitment being sealed to the neck portion in accordance with an embodiment of the present disclosure.

With the base 72 located in the neck portion 30, an embodiment of the process includes heat sealing the base 72 of the fitment 70 to the neck portion 30. The heat sealing procedure utilizes opposing heat seal clamps 90, 92 as shown in FIGS. 12-13. The heat seal clamps are heated to a temperature greater than or equal to the melt temperature (Tm) of the seal layer of the multilayer film and less than the melt temperature of the fitment 70. The heat seal clamps 90, 92 compress the seal layer of the multilayer film against the outer surface of the base 72 for a duration from 0.1 seconds, or 0.5 seconds, or 1.0 second, or 2.0 seconds, or 3.0 seconds, or 4.0 seconds, or 5.0 seconds to 6.0 seconds, or 7.0 seconds, or 8.0 seconds, or 9.0 seconds or 10 seconds. The mandrel 80 supports the fitment 70 during the contact and compression between the heat seal clamps 90, 92 and the neck portion 30. In an embodiment, the process includes supporting the base 72 with the mandrel 80 during the seal process. The seal process can be clamp heat seal or ultrasonic seal. Support of the fitment 70 by the mandrel 80 advantageously avoids deformation of the fitment 70 (and the base 72 and the closure 74) during the heat seal procedure.

In an embodiment, the process includes ultrasonic sealing the base 72 of the fitment 70 to the neck portion 30. Ultrasonic sealing entails directing ultrasonic vibration to the interface between the base 72 and the neck portion 30 while pressure is applied. The ultrasonic energy melts a portion of the interface to create a seal between the base 72 and the neck portion 30. In an embodiment, the process includes ultrasonically sealing a base 72 composed of ethylene/α-olefin copolymer such as ELITE™ (4.0 MI and 122° C. Tm) to a neck portion 30 having seal layer composed of ethylene/α-olefin copolymer ELITE™ 5400G (1.0 MI, 122° C. Tm) and/or ethylene/α-olefin copolymer AFFINITY™ PL 1880G (1.0 MI, 99° C. Tm).

Since ultrasonic sealing heats only the seal layer, the Tm of the seal layer can be from 10° C. to 5° C. less than the Tm of the fitment. In an embodiment, the process includes ultrasonically sealing a fitment 70 composed of an ethylene/α-olefin copolymer (such as AFFINTIY™ PL 1880G) having a Tm of 99° C. to a neck portion 30 having a seal layer composed of an LDPE with a Tm of 105° C.

In an embodiment, the process includes rotating the flexible container 90° or from 80° to 100°, with respect to the heat seal clamps and repeating the heat sealing procedure described above. FIG. 12 shows the first heat seal sequence and FIG. 13 shows the second heat seal sequence with the flexible container 10 rotated 90°. Heat seal clamps 90, 92 move in opposing directions and toward each other to compress heat seal the neck portion 30 onto the base 72.

In an embodiment, the process includes forming a watertight seal between the base 72 and the neck portion 30.

In an embodiment, the process includes forming a watertight and airtight seal between the base 72 and the neck portion 30.

As shown in FIG. 14, the heat seal formed between the neck portion 30 and the base 72 defines an excess flare portion 96. Thus, an embodiment of the present process includes forming, with the adjoining, an excess flare portion.

In an embodiment, the process includes removing the excess flare portion 96 from the flexible container 10. FIGS. 14-16 show a score device 100 placed into contact with the neck portion 30 of the flexible container 10. A blade portion 102 of the score device 100 contacts the neck portion 30 as the flexible container 10 is rotated to score, cut, or otherwise disconnect the excess flange portion 96 from the neck portion 30. The mandrel 80 is then moved away from the fitment 70 (or vice versa) and the excess score portion 96 is removed from the flexible container 10. The excess flare portion 96 may be recycled or discarded.

In an embodiment, the process includes inserting the fitment through the flare portion. The mandrel enters the neck portion such that the fitment base enters the container interior. The mandrel may extend to such a length that the entire fitment (base and top) may be inserted, or otherwise enter, the container interior. The process includes contacting the score device with the neck portion and supporting the neck portion with the mandrel during the contacting. The process includes rotating the neck portion (or rotating the score device) to cut excess flare portion from the neck portion. In this way, the mandrel supports the neck during scoring, thereby avoiding cuts to the fitment. The process includes removing the excess flare portion from the neck portion. Once the excess flare portion is removed, the process includes retracting, with the mandrel, the fitment into the neck portion and sealing the fitment base to the neck portion.

Figure 17:
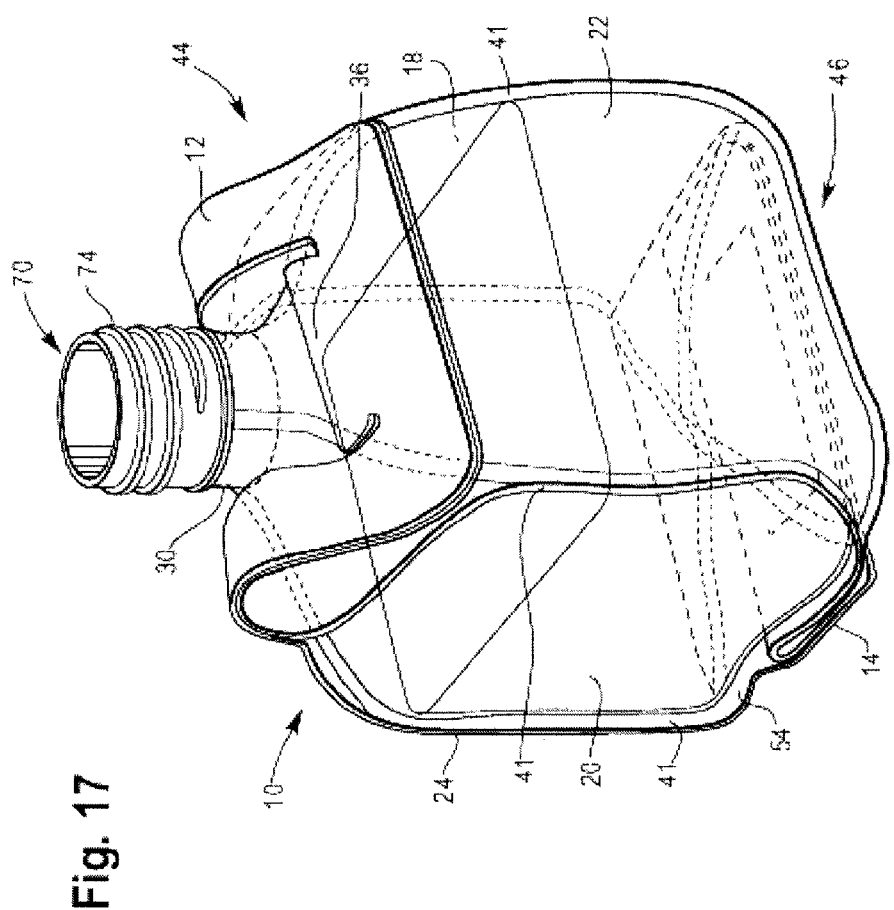
FIG. 17 is a perspective view of a flexible container with a fitment in accordance with an embodiment of the present disclosure.

FIG. 17 shows the completed flexible container 10 having the fitment 70 inserted thereon. A flowable substance is located in the container interior. The flexible container 10 is a stand-up container (otherwise known as a stand-up pouch or SUP).

In an embodiment, a flowable substance can be added to the flexible container 10 either before or after the fitment 70 is inserted into the flare portion 50. The flowable substance can be any flowable substance (particulate or liquid) as previously disclosed above. In one embodiment, the process includes inserting a flowable substance through the fitment 70 that is previously adjoined to the neck portion 30.

In another embodiment, the process includes adding a flowable substance to the flexible container interior before the fitment 70 is inserted into the expanded end 51. The process includes adding the flowable substance through the expanded end 51, through the flare portion 50, through the neck portion 30, and into the container interior. After flowable substance is added to the container interior, the fitment 70 can be inserted into the expanded end 51, into the flare portion 50, and adjoined to the neck portion 30 as previously discussed above.

In an embodiment, a carry member is attached to the fitment. The carry member can be attached to fit around a portion of, or all, the outer circumference of the fitment by way of one, some, or all of the following: friction fit, compression fit, and snap-on fit. The carry member is advantageous when the flexible container does not include handles. The carry member can also be used to dispense the contents from the flexible container.

3. Sealed Container No Fitment

The present disclosure provides another process. In an embodiment, the process includes (A) providing a flexible container with four panels. The four panels form (i) a body portion, (ii) a neck portion, (iii) a tapered transition portion between the body portion and the neck portion, and (iv) the neck portion has a reduced width. The process includes (B) adding, through the neck, a flowable substance into the container interior; and (C) sealing the neck portion.

The flexible container can be any flexible container as described above. However, in this embodiment, the flexible container lacks a fitment (i.e., lacks fitment 70) and the flare portion is optional.

In an embodiment, the flexible container does not include, or is otherwise void of, a flare portion as shown in FIG. 18. The process includes sealing the neck portion 30 and forming a neck seal 150. The neck seal 150 can be a heat seal, an adhesive seal, and a combination thereof.

In an embodiment, the neck seal 150 is a heat seal.

The neck seal 150 may include notches 152 (or cut-outs), and/or a perforation 154 to promote actuation of, or opening, the neck seal 150. Actuation of the neck seal 150 may be performed by hand (tear seal) or by way of scissors, blade or other sharp object.

In an embodiment, the flexible container 10 includes the flare portion 50 as shown in FIG. 19. The flare portion 50 has an expanded end 51, and the width of the flare portion gradually increases from the neck portion to the flare expanded end, as previously disclosed herein. The process includes adding a flowable substance through the expanded end 51, through the flare portion 50, through the neck portion 30, and into the container interior. With the flowable substance in the container interior, the process includes sealing the flare portion 50 to form a flare seal 160 as shown in FIG. 19. The flare portion 50 can be sealed at the expanded end 51, below the expanded end 51, and combinations thereof. It is understood that when the flexible container includes the flare portion, the flare seal replaces, or otherwise substitutes, the neck seal.

The flare seal 160 can include notches 162 and/or a perforation 164 to promote actuation of the flange seal as disclosed above with respect to the neck seal.

The flexible container with the neck seal or the flare seal can be a single use container or a re-sealable container. In an embodiment, the flexible container is a single use container and the process includes adding a flowable substance through either the neck portion 30 (or through the flare portion 50) and into the container interior. With the flowable substance in the container interior, the process includes forming a notched seal (also known as a tear seal) in either the neck portion 30 (notches 152, FIG. 18), or in the flare portion 50 (notches 162, FIG. 19). When the notched seal is actuated, access to the container interior is provided and the flowable substance is dispensed through the neck portion 30 (or the flare portion 50).

In an embodiment, either the neck seal 150 or the flare seal 160 can be a re-sealable seal. The process includes adding a flowable substance through the neck 30 (or through the expanded end 51, through the flare portion 50, through the neck portion 30), and into the container interior. With the flowable substance in the container interior, the process includes forming a re-sealable seal in either the neck portion 30 or in the flare portion 50.

FIG. 18 shows an interlocking rib structure 156 that is a re-seal structure such as a Zip-loc-type re-seal structure, for example. Other nonlimiting examples of suitable re-sealable seals include a peelable seal, a flap seal, an adhesive seal (such as a pressure sensitive adhesive seal, a zipper seal, hook and loop re-seal structure (Velcro-type seal), and any combination thereof.

In an embodiment, either the neck seal 150 or the flare seal 160 includes a microcapillary strip. With actuation of seal 150/160, the microcapillary strip provides controlled spray delivery of the container contents.

In an embodiment, either the neck seal 150 or the flare seal 160 may include a closure. The closure covers the exposed opening of the neck seal or flare seal after the seal has been actuated. Nonlimiting examples of suitable closures include a Ziploc-type closure, hook and loop material (i.e., Velcro), an adhesive strip (such as packaging tape, for example), and flexible material hingedly attached to the flexible pouch for placement over the opened seal.

The present process may comprise two or more embodiments disclosed herein.

DEFINITIONS

The numerical ranges disclosed herein include all values from, and including, the lower value and the upper value. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight, and all test methods are current as of the filing date of this disclosure.

The term "composition," as used herein, refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Dart drop test is measured in accordance with ASTM D 1709 with results reported in grams, g.

Density is measured in accordance with ASTM D 792 with results reported as grams per cubic centimeter, or g/cm³.

Elmendorf tear, machine direction, MD, cross direction CD, is measured in accordance with ASTM D 1922, with results reported in grams, g.

An "ethylene-based polymer," as used herein is a polymer that contains more than 50 mole percent polymerized ethylene monomer (based on the total amount of polymerizable monomers) and, optionally, may contain at least one comonomer.

Flexural modulus (2%) is measured in accordance with ASTM D 790 with results reported in megaPascals, MPa.

The term "heat seal initiation temperature," is minimum sealing temperature required to form a seal of significant strength, in this case, 2 lb/in (8.8N/25.4 mm). The seal is performed in a Topwave HT tester with 0.5 seconds dwell time at 2.7 bar (40 psi) seal bar pressure. The sealed specimen is tested in an Instron Tensiomer at 10 in/min (4.2 mm/sec or 250 mm/min).

Izod impact resistance is measured at 25° C. and in accordance with ASTM D 256 with results reported in Joules per meter, J/m.

Melt flow rate (MFR) is measured in accordance with ASTM D 1238, Condition 280° C./2.16 kg (g/10 minutes).

Melt index (MI) is measured in accordance with ASTM D 1238, Condition 190° C./2.16 kg (g/10 minutes).

Secant modulus (2%), MD and CD, is measured in accordance with ASTM D 882 with results reported as megaPascals, or MPa.

Strain at tensile strength, MD and CD, is measured in accordance with ASTM D 882 with results reported as percent, %.

Tensile elongation to break is measured in accordance with ASTM D 638 with results reported in percent, %.

Tensile strength, MD and CD, is measured in accordance with ASTM D 882 with results reported as megaPascals, or MPa.

Tensile strength to yield is measured in accordance with ASTM D 638 results reported in megaPascals, MPa.

Tm or "melting point" as used herein (also referred to as a melting peak in reference to the shape of the plotted DSC curve) is typically measured by the DSC (Differential Scanning Calorimetry) technique for measuring the melting points or peaks of polyolefins as described in U.S. Pat. No. 5,783,638. It should be noted that many blends comprising two or more polyolefins will have more than one melting point or peak, many individual polyolefins will comprise only one melting point or peak.

An "olefin-based polymer," as used herein is a polymer that contains more than 50 mole percent polymerized olefin monomer (based on total amount of polymerizable monomers), and optionally, may contain at least one comonomer. Nonlimiting examples of olefin-based polymer include ethylene-based polymer and propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in, this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 mole percent polymerized propylene monomer (based on the total amount of polymerizable monomers) and, optionally, may contain at least one comonomer.

Some embodiments of the present disclosure will now be described in detail in the following Examples.

EXAMPLES

1. Materials

Four panel flexible containers having a neck and a body as shown in FIGS. 1-6 are formed using the seven-layer film provided in Table 1. The containers used in the present examples and in the comparative samples (CS) are produced with a volume of 3.875 L using a 150 micrometer (m) seven-layer film ISO X7-7135C-1TC produced by ISO Poly Films (Gray Court, S.C.) as shown in Table 1.

TABLE 2

| Film Properties for ISO X7-7135C-1TC | | | |
|---|---|---|---|
| Property | Method | Units | Value |
| Dart Drop test | ASTM D1709 | g | 1500 |
| 2% Secant Modulus, machine direction (MD) | ASTM D882 | MPa | 172+/12 |
| 2% Secant Modulus, cross direction (CD) | ASTM D882 | MPa | 180 +/− 15 |
| Film Thickness | ASTM D6988 | Micrometers | 152 +/− 2 |
| Elmendorf Tear, MD | ASTM D1922 | g | 5553 +/− 692 |
| Elmendorf Tear, CD | ASTM D1922 | g | 5471 +/− 979 |
| Tensile Strength MD | ASTM D882 | MPa | 31.2 +/− 0.7 |
| Strain at Tensile Strength MD | ASTM D882 | % | 434 +/− 12 |
| Tensile Strength CD | ASTM D882 | MPa | 31.0 +/− 1.3 |
| Strain at tensile Strength CD | ASTM D882 | % | 468 +/− 9 |

The flexible containers are fabricated under the heat seal conditions provided in Table 3 below using fabrication equipment by KRW Machinery Inc. (Weaverville, N.C.). All seals in the flexible containers are made with one strike.

TABLE 1

| Composition of 7-layer coextruded flexible multilayer film | | | | | |
|---|---|---|---|---|---|
| Overall | Description | % Thickness | Weight % | Layer | Density |
| ULTRAMID C33L01 | Nylon 6/66 viscosity number 195 cm³/g (ISO 307 @ 0.5% in 96% H₂SO₄), melting point 196° C. (ISO 3146) | 13.0% | 15.3% | 1 | 1.12 |
| AMPLIFY TY1352 | Maleic anhydride grafted polyethylene 0.922 g/cm³; 1.0 MI @ 2.16 Kg 190° C. | 12.0% | 11.6% | 2 | 0.922 |
| ELITE 5400G | Polyethylene density 0.916 g/cm³; 1.0 MI @ 2.16 Kg 190° C. | 20.0% | 19.2% | 3 | 0.916 |
| AMPLIFY TY1352 | Maleic anhydride grafted polyethylene 0.922 g/cm³; 1.0 MI @ 2.16 Kg 190° C. | 12.0% | 11.6% | 4 | 0.922 |
| ULTRAMID C33L01 | Nylon 6/66 viscosity number 195 cm³/g (ISO 307 @0.5% in 96% H₂SO₄), melting point 196° C. (ISO 3146) | 6.0% | 7.0% | 5 | 1.12 |
| AMPLIFY TY1352 | Maleic anhydride grafted polyethylene 0.922 g/cm³; 1.0 MI @ 2.16 Kg 190° C. | 12.0% | 11.6% | 6 | 0.922 |
| AFFINITY PF1146G | Ethylene alpha-olefin copolymer 0.899 g/cm³; 1.0 MI @ 2.16 Kg 190° C. | 23.6% | 22.3% | 7* | 0.899 |
| AMPACET 10090 (S) | Slip masterbatch available from Ampacet Corp. | 1.0% | 1.0% | 7* | 0.92 |
| AMPACET 10063 (AB) | Antiblock masterbatch available from Ampacet Corp. | 0.4% | 0.4% | 7* | 1.05 |
| Total | | 100.0% | 100.0% | | |

*layer 7 is a 3-component blend, layer 7 is the heat seal layer (or seal layer)

TABLE 3

Heat Seal Conditions for 0.15 mm Films (Web Sandwich of 0.6 mm, 4 ply)

| Seals | Seal Bar Temperature, ° C. | Platen Pressure, J/cm² | Dwell Time, sec | Overseal protrusion height, mm | Seal Bar Dimensions |
|---|---|---|---|---|---|
| Peripheral | 143 | 258 | 0.75 | 0 | 10 mm × perimeter for 3.875 L |
| Overseal | 182 | 258 | 0.75 | 0.30 | 3.2 mm × 25.4 mm (overseal bar, centered about the apex point, W = 3.5 mm) |

The flexible containers have the container geometry as described herein. In particular, each flexible container tested has the bottom geometry as shown in FIG. 4 and an overseal shown in FIG. 6. The distance between the apex point and BDISP (i.e., distance S) is approximately 4 mm.

Table 4 provides nonlimiting examples of materials suitable to produce a fitment that can be used in the present process. In an embodiment, the fitment is composed of a material having an Izod impact resistance from greater than 50 J/m to 500 J/m and shown in Table 4 below.

frequent fold over of the neck film requiring manual unfolding of the film and resulting in slower speeds of manufacture. Failure to properly seat the film onto the fitment prior to sealing can also result in sealing failures at or near locations where the film is folded over by the insertion process. 10 production runs under these parameters are performed and the times for each production phase are averaged as shown in Table 5.

TABLE 4

Fitment Material Performance

| Material | Product | density | MI | Tensile Strength to Yield (MPa) | Tensile Elongation to Break (%) | Flexural Modulus 2% Secant (MPa) | Izod Impact Resistance 25° C. (J/m) | Tm (° C.) |
|---|---|---|---|---|---|---|---|---|
| High Density Polyethylene | Dow HDPE 8262B | 0.960 | 8 | 29 | 670 | 1110 | 15** | 140 |
| High Density Polyethylene | Dow DMDA 8920 | 0.954 | 20 | 28.3 | 250 | 1150 | 21** | 130 |
| Low Density Polyethylene | LDPE 993I (Dow) | 0.923 | 25 | 10.3 | 40 | 317 | 420 | 110 |
| Linear Low Density polyethylene | Dow DNDA 8320 | 0.924 | 20 | 11.7 | 60 | 386 | — | 123 |
| Linear Low Density polyethylene | LLDPE DOWLEX ™ 2535 | 0.919 | 6 | 8.1 | 560 | 328 | 430 | 124 |
| Enhanced polyethylene | ELITE ™ 5230G | 0.916 | 4 | 9 | 539 | — | — | 122 |
| Polypropylene Homopolymer | Braskem PP 5E16S hPP | 0.910 | 40⁺ | 32 | 7 | 1351* | 27** | ~165 |
| Polypropylene Impact Copolymer | A. Shulman Polypropylene 1188-01 | 0.900 | 5⁺ | 20.7 | >50 | 850* | 530 | ~135 |

*1% secant modulus

⁺MFR

**comparative sample

Comparative Sample 1 (CS1)

A 3.875 L container blank made at the above conditions of film ISO X7-7135C-1TC and sealed as in Table 3 having no flare portion (fully formed container but has not had fitment yet attached) such that the neck is uniform in diameter. An HDPE fitment (70) of design shown in FIGS. 7-17 with 38 mm outer diameter (OD) at threads and 41 mm OD with 1.6 mm wall thickness at base is inserted into the top of the fully formed blank without any flare portion. Insertion of the fitment into the top of the neck results in Example 1

A 3.875 L container blank made at the above conditions of film ISO X7-7135C-1TC and sealed as in Table 3 but having a flare portion such that top opening is a greater diameter than the neck diameter. An HDPE fitment 70 of design shown in FIGS. 7-17 with 38 mm OD at threads and 41 mm OD with 1.6 mm wall thickness at base is inserted directly into the top opening of the flare portion and into the neck without folds of the film of the neck allowing easy placement of the fitment into the neck and good sealing of the film of the neck to the fitment. 10 production runs under these parameters are performed and the times for each production phase are averaged as shown in Table 5.

Example 2

A 3.875 L container blank made at the above conditions of film ISO X7-7135C-1TC and sealed as in Table 3 but having a flare portion such that top opening is a greater diameter than the neck diameter. An HDPE fitment 70 of design shown in FIGS. 7-17 with 38 mm OD at threads and 41 mm OD with 1.6 mm wall thickness at base is inserted directly into the top opening of the flare portion and into the neck without folds of the film of the neck allowing easy placement of the fitment into the neck and good sealing of the film of the neck to the fitment. The flare portion is hand trimmed at the bottom of the flare portion with blade against film on fitment (as in FIGS. 7-16, but by hand). The flare portion is then removed from the container. 10 production runs under these parameters are performed and the times for each production phase are averaged as shown in Table 5.

Example 3

A 3.875 L container blank made at the above conditions of film listed in Table 1 above has no fitment but having a flare portion such that top opening is a greater diameter than the neck diameter. An HDPE fitment 70 of design shown in FIGS. 7-17 with 38 mm outer diameter (OD) at threads and 41 mm OD with 1.6 mm wall thickness at base is inserted into the top opening, through the flare portion but deeper and past the neck to allow the base of the flare portion to be supported only by the mandrel. The film is then trimmed at the base of the flare portion on the mandrel support and the fitment is then pulled back into the neck in position for sealing. The heat seal is made between the neck portion and the fitment base. The mandrel is then retracted from the sealed fitment and the excess flare portion removed. 10 production runs under these parameters are performed and the times for each production phase are averaged as shown in Table 5.

Table 5 shows the production steps from fitment insertion to heat sealing. These steps constitute the total time to build a flexible container with fitment, i.e., the "Total Build Time." Total Build Time is reported in seconds. The values in Table 5 are an average of 10 production runs under the stated parameters for each sample.

TABLE 5

| | | | | | | | | |
|---|---|---|---|---|---|---|---|---|
| Build time for containers with fitments by hand | | | | | | | | |
| Example | Insertion description (average of 10 builds) | Insert time, sec | Trim time, sec | Position time, sec | $1^{st}$ Seal, sec 177° C./4.4 bar | $2^{nd}$ seal (90 deg), sec 177° C./4.4 bar | Total seal time, sec | Total Build Time (sec) |
| CS 1 | Base inserted into neck by hand and sealed | 60 | NA | 4 | 4 | 2 | 6 | 70 |
| Ex 1 | Base inserted into flare top/neck by hand and sealed | 7 | NA | 4 | 4 | 2 | 6 | 1.7 |
| Ex 2 | Base insert into flare top/neck, trimmed on fitment by hand and sealed | 7 | 20 | 4 | 4 | 2 | 6 | 37 |
| Ex 3 | Base insert into flare top past neck, trimmed on mandrel by hand, pulled back into neck and sealed | 7 | 14 | 4 | 4 | 2 | 6 | 31 |

Examples 1-3 each have a Total Build Time that is less than the Total Build Time for Comparative Sample 1. Table 5 shows that provision of the flare portion reduces production time (i.e., reduces Total Build Time) and improves production efficiency.

Comparative Sample 2 (CS2) and Examples 4-5

Containers are made as in the process described in Example 1 but using an alternate 38 mm fitment material having 1.6 mm wall thickness. The examples in Table 6 show a fitment consisting of different materials can be successfully installed. In an embodiment, the fitments have Izod impact strengths by ASTM D256 from greater than 50 J/m to 500 J/m. Table 6 also shows seals that have both strength and hermeticity can be achieved as shown by successful burst and hang tests, respectively.

TABLE 6

Examples of containers made with fitments of different materials

| Example | Material | Product | Seal conditions (Temperature, seal time, pressure) | Burst test | Hang test |
|---|---|---|---|---|---|
| CS2 (comparative) | High Density Polyethylene | DMDA 8920 | 177° C., 4 sec $1^{st}$ seal, rotate 90deg, 2 sec seal $2^{nd}$ seal, 4.4 bar | Pass | Pass |
| Ex 4 | High Density Polyethylene with modifier | DMDA 8920 + 20% ENGAGE ™ 8200 | 177° C., 4 sec $1^{st}$ seal, rotate 90deg, 2 sec seal $2^{nd}$ seal, 4.4 bar | Pass | Pass |
| Ex 5 | Linear Low Density polyethylene | DNDA 8320 | 177° C., 4 sec $1^{st}$ seal, rotate 90deg, 2 sec seal $2^{nd}$ seal, 4.4 bar | Pass | Pass |

Burst Test Procedure
Process:
1.) All flexible containers are numbered/tagged with testing number, identifying film #, and production set points (if necessary)
2.) All flexible containers are pre-inflated via manual inflation or compressed air.
3.) Caps are applied tightly.
4.) Flexible containers are placed inside the vacuum pressure chamber and lid is closed.
5.) Vacuum pressure is applied via vacuum pump. Pressure should be applied slowly as flexible container continues to inflate.
6.) Units of vacuum are recorded in (inHg). Exceptional results are 18 (inHG) held for 60 seconds. Passing is 12 (inHg).
7.) Any weak areas of seal will be exposed as leaks during the testing time period. Bubbles should be looked for and can indicate a weak area of the flexible container.
8.) The flexible container is filled completely with air and the closure on the fitment is tightened. Then the flexible container is completely submerged in a water bath. The chamber over the water is then evacuated to create a vacuum. A "pass" score for the burst test is when there are no bubbles visually observed in the water bath after 30 seconds at 40 kilopascals of vacuum.

Gravity Hang Test Procedure
Process:
1.) All flexible containers are numbered/tagged with testing number, identifying film #, and production set points (if necessary)
2.) All flexible containers are filled with room temp water to recommended fill height.
3.) 3 drops of Methylene Blue die and 3 drops of surfactant (soap) are added to each flexible container and agitated.
4.) Closures are applied tightly to the fitment.
5.) Flexible containers are then hung both neck side down and neck side up to test the strength of both the neck seal and the caulk seal areas.
6.) Flexible containers are left hanging for 48 hours.
7.) Any weak areas of seal will be exposed as leaks during the testing time period.
8.) A "pass" score for the hang test is hanging the flexible container for 48 hours without a leak detected. Leaks are detected by visual identification of white paper below the flexible container to show any drops that have fallen. The water solution added to the flexible container contains a blue vegetable dye for aiding visual detection of the leak. The water solution also contains a drop or two of soap (Dawn dish soap) where the soap surfactant helps allow water to penetrate any gaps in seal that might be present.

Wall Thickness is Thickness (in Mm) of the Fitment Base.

For example, the stiffness factor of HDPE 8262B at 1 mm wall thickness (1.1), is equivalent to the stiffness factor (1.1) of LLDPE Dowlex 2535 or LDPE 9931 at a wall thickness of 1.5 mm. For a lower modulus material such as ENGAGE 8401, a wall thickness of 3.3 mm would be required to obtain a stiffness factor of 1.1.

Applicant discovered that utilization of the present process (mandrel support of fitment and subsequent fitment insertion into neck portion via expanded end and flare portion) advantageously enables "thin-walling," or the reduction of the wall thickness for the fitment base, permitting the use of thinner walled fitments as well as the opportunity to use different materials for the fitments.

For example, the wall thickness of the fitment base used in conventional four-sided flexible containers is about 2.0 mm. The present process advantageously enables "thin-walling," or the reduction of the wall thickness for the base of the fitment. Applicant unexpectedly found that the present process enables the production of a four-panel flexible container with a fitment having a base wall thickness from 0.15 mm, or 0.2 mm, or 0.3 mm, or 0.5 mm, or 0.7 mm, or 0.9 mm, or 1.0 mm to 1.1 mm, or 1.3 mm, or 1.5 mm, or 1.7 mm, or 1.9 mm.

It is specifically intended that the present disclosure not be limited to the embodiments and illustrations contained herein, but include modified forms of those embodiments including portions of the embodiments and combinations of elements of different embodiments as come with the scope of the following claims.

The invention claimed is:
1. A flexible container comprising:
   four panels at least one panel being a gusset panel, all four panels forming
   (i) a body portion;
   (ii) a neck portion, and a flare portion that extends from the neck portion;
   (iii) a tapered transition portion between the body portion and the neck portion;
   (iv) the neck portion having a reduced width, the flare portion having an expanded end;
   the width of the flare portion gradually increases from the neck portion to the expanded end;

a fitment inserted into the flare portion, the fitment comprising a base having a circular cross section, the base sealed to each of the four panels in the neck portion; and the seal between the base and the neck portion defines an excess flare portion having an open expanded end.

2. The flexible container of claim 1 wherein the expanded end has a width that is greater than the width of the neck portion and the flare portion defines a frustoconical-shaped inner volume when the flexible container is in an expanded configuration.

3. The flexible container of claim 2 wherein the expanded end is open and permits access to the container interior.

4. The flexible container of claim 1 wherein the expanded end has a width that is from 1.1 times to 8.0 times greater than the width of the neck portion.

5. The flexible container of claim 1 wherein the flexible container comprises at least one handle.

6. The flexible container of claim 1 wherein the fitment is composed of a polymeric composition having an Izod impact resistance from 50 J/m to 500 J/m.

7. The flexible container of claim 1 wherein the panels are formed from a multilayer film having a seal layer comprising a polymer; and the fitment comprises a polyolefin having an Izod impact resistance from greater than 50 J/m to 500 J/m and a melt temperature (Tm) greater than or equal to the Tm of the seal layer polymer.

8. A flexible container comprising:

four panels at least one panel being a gusset panel, all four panels forming
  (i) a body portion;
  (ii) a neck portion, and a flare portion that extends from the neck portion, the flare portion having an expanded end;
  (iii) a tapered transition portion between the body portion and the neck portion;
  (iv) the neck portion having a reduced width, and
a fitment heat sealed to each of the four panels in the neck portion, the fitment composed of a polymeric composition having an Izod impact resistance from greater than 50 J/m to 500 J/m; and the heat seal defining an excess flare portion having an open expanded end.

9. The flexible container of claim 8 wherein the fitment comprises a base having a circular cross section, and the base has a wall thickness from 0.15 mm to 1.9 mm.

10. The flexible container of claim 8 wherein
each panel includes a bottom face comprising two opposing peripheral tapered seals, each peripheral tapered seal extending from a respective peripheral seal, each peripheral tapered seal comprising an inner edge, the peripheral tapered seals converging at a bottom seal area;

the front panel bottom face comprises a first line defined by the inner edge of the first peripheral tapered seal and a second line defined by the inner edge of the second peripheral tapered seal inner edge, the first line intersecting the second line at an apex point in the bottom seal area;

the front panel bottom face has a bottom distalmost inner seal point on the inner edge; and the apex point is separated from the bottom distalmost inner seal point by a distance from 0 mm to less than 8.0 mm.

11. The flexible container of claim 8 wherein the expanded end has a width that is greater than the width of the neck portion and the flare portion defines a frustoconical-shaped inner volume when the flexible container is in an expanded configuration.

* * * * *